US010873863B2

(12) United States Patent
Misenheimer et al.

(10) Patent No.: US 10,873,863 B2
(45) Date of Patent: Dec. 22, 2020

(54) LINE OF SIGHT AIRCRAFT DATA TRANSFER SYSTEM

(71) Applicant: GE Aviation Systems LLC, Grand Rapids, MI (US)

(72) Inventors: Steven Lane Misenheimer, Rockford, MI (US); Joseph Steffler, Alto, MI (US)

(73) Assignee: GE AVIATION SYSTEMS LLC, Grand Rapids, MI (US)

( * ) Notice: Subject to any disclaimer, the term of this patent is extended or adjusted under 35 U.S.C. 154(b) by 0 days.

(21) Appl. No.: 16/575,942

(22) Filed: Sep. 19, 2019

(65) Prior Publication Data

US 2020/0029227 A1 Jan. 23, 2020

Related U.S. Application Data

(63) Continuation of application No. 15/603,049, filed on May 23, 2017, now Pat. No. 10,455,431.

(51) Int. Cl.
*H04W 16/28* (2009.01)
*H04B 7/185* (2006.01)
(Continued)

(52) U.S. Cl.
CPC .............. *H04W 16/28* (2013.01); *H01Q 1/28* (2013.01); *H01Q 3/2605* (2013.01);
(Continued)

(58) Field of Classification Search
CPC ............ H04B 7/18506; H04B 7/18508; H04B 7/18504; H04W 72/0473; H04W 72/0453; H04W 16/28; H04W 76/02
See application file for complete search history.

(56) References Cited

U.S. PATENT DOCUMENTS 5,949,766 A 9/1999 Ibanez-Meier et al.
7,283,844 B2 10/2007 Thompson
(Continued)

FOREIGN PATENT DOCUMENTS

| EP | 2 161 855 A1 | 3/2010 |
|---|---|---|
| EP | 2988559 A2 | 2/2016 |
| EP | 3407424 A1 | 11/2018 |

OTHER PUBLICATIONS

Non-Final Office Action received for U.S. Appl. No. 15/603,049 dated Jan. 8, 2019, 18 pages.
(Continued)

*Primary Examiner* — Jamal Javaid
(74) *Attorney, Agent, or Firm* — Amin, Turocy & Watson, LLP

(57) ABSTRACT

Techniques for establishing a establishing of a high-bandwidth data connection with an aircraft using highly directional EM beam shaped transmissions are provided. In one example, a method comprises: determining a first line of sight that is unobstructed to an antenna of an aircraft, establishing a wireless data connection having a defined data transfer rate between the aircraft and the communication device using highly directional EM beam shaped transmissions along the unobstructed line of sight, transferring a defined amount of data between the aircraft and the communication device using the wireless data connection.

20 Claims, 23 Drawing Sheets

(51) Int. Cl.
  *H01Q 3/26* (2006.01)
  *H04B 17/336* (2015.01)
  *H04W 76/10* (2018.01)
  *H01Q 1/28* (2006.01)
  *H04W 28/20* (2009.01)
  *H04W 64/00* (2009.01)
  *H04W 72/04* (2009.01)
  *H04B 7/06* (2006.01)

(52) U.S. Cl.
  CPC ..... *H04B 7/18504* (2013.01); *H04B 7/18506* (2013.01); *H04B 17/336* (2015.01); *H04W 28/20* (2013.01); *H04W 64/006* (2013.01); *H04W 72/0453* (2013.01); *H04W 72/0473* (2013.01); *H04W 76/10* (2018.02); *H04B 7/0617* (2013.01)

(56) References Cited

U.S. PATENT DOCUMENTS

| | | | |
|---|---|---|---|
| 7,385,560 | B1 | 6/2008 | Maloratsky et al. |
| 8,023,949 | B2 | 9/2011 | Horton, Jr. et al. |
| 9,426,768 | B1 | 8/2016 | Small et al. |
| 10,455,431 | B2 | 10/2019 | Misenheimer et al. |
| 2004/0132495 | A1 | 7/2004 | Horton, Jr. et al. |
| 2013/0321201 | A1 | 12/2013 | Savoy et al. |
| 2015/0222350 | A1 | 8/2015 | Shi |
| 2015/0244478 | A1* | 8/2015 | Shirakata ............. H04B 17/309 370/252 |
| 2016/0099769 | A1 | 4/2016 | Moffatt et al. |
| 2016/0380692 | A1 | 12/2016 | Jalali et al. |
| 2017/0214456 | A1* | 7/2017 | Ozaki ...................... H01Q 3/18 |
| 2017/0302368 | A1* | 10/2017 | Trott .................. H04B 7/18504 |
| 2017/0324469 | A1* | 11/2017 | Jalali ................. H04B 7/18502 |

OTHER PUBLICATIONS

First Examination Report received for Canadian Patent Application Serial No. 3004568 dated Mar. 1, 2019, 7 pages.
Extended European Search Report received for EP Patent Application Serial No. 18173652.1 dated Oct. 15, 2018, 7 pages.
Communication pursuant to Rule 69 EPC received for EP Patent Application Serial No. 18173652.1 dated Dec. 3, 2018, 2 pages.
Canadian Office Action for Canadian Application Serial No. 3,004,568 dated Jan. 15, 2020, 5 pages.
Communication pursuant to Rule 94(3) EPC received for EP Patent Application Serial No. 18173652.1 dated Dec. 2, 2019, 5 pages.
Communication pursuant to Article 94(3) EPC for European Application Serial No. 18 173 652.1 dated Sep. 9, 2020, 6 pages.
Canadian Office Action for Canadian Application Serial No. 3,004,568 dated Oct. 26, 2020, 5 pages.

* cited by examiner

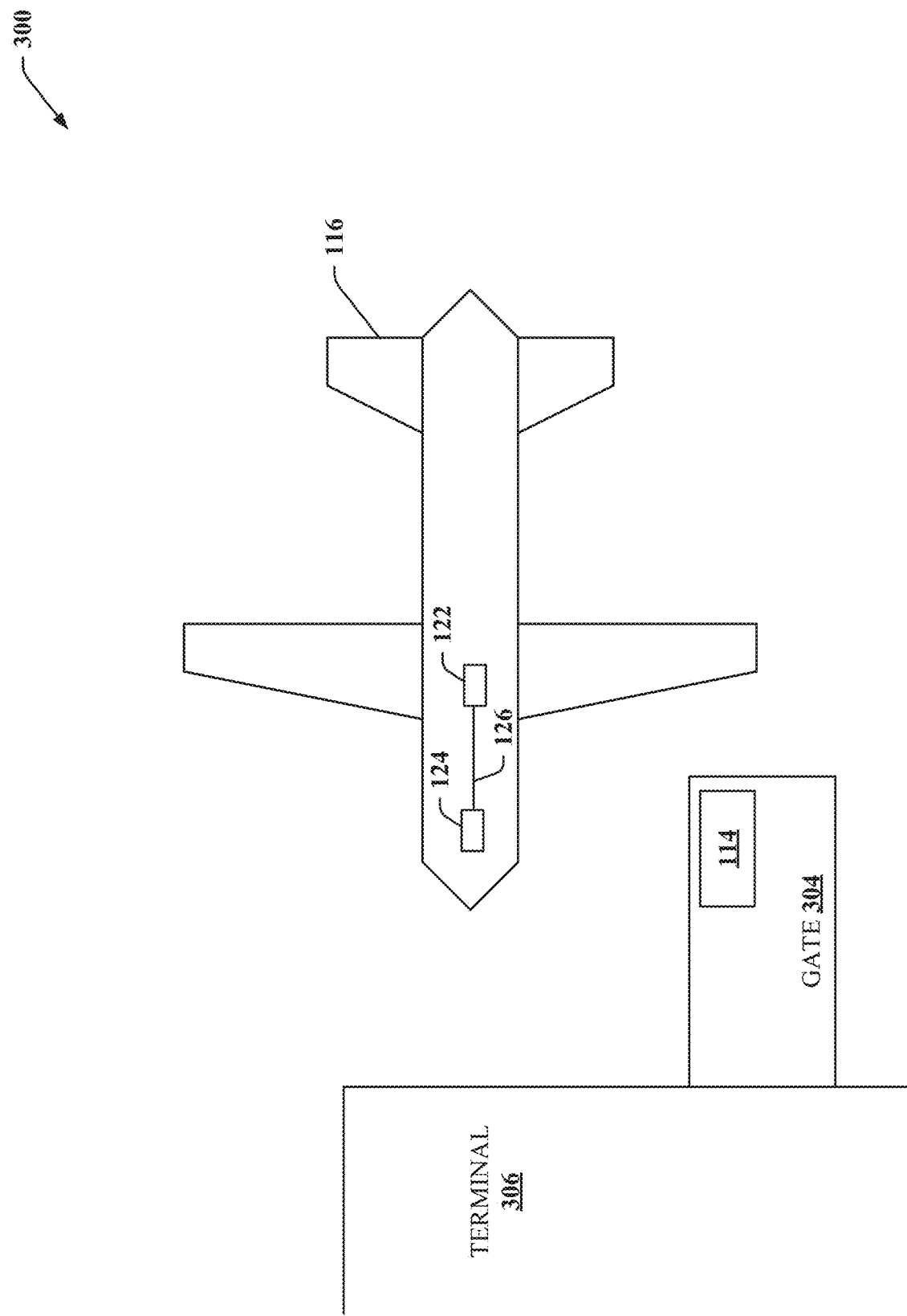

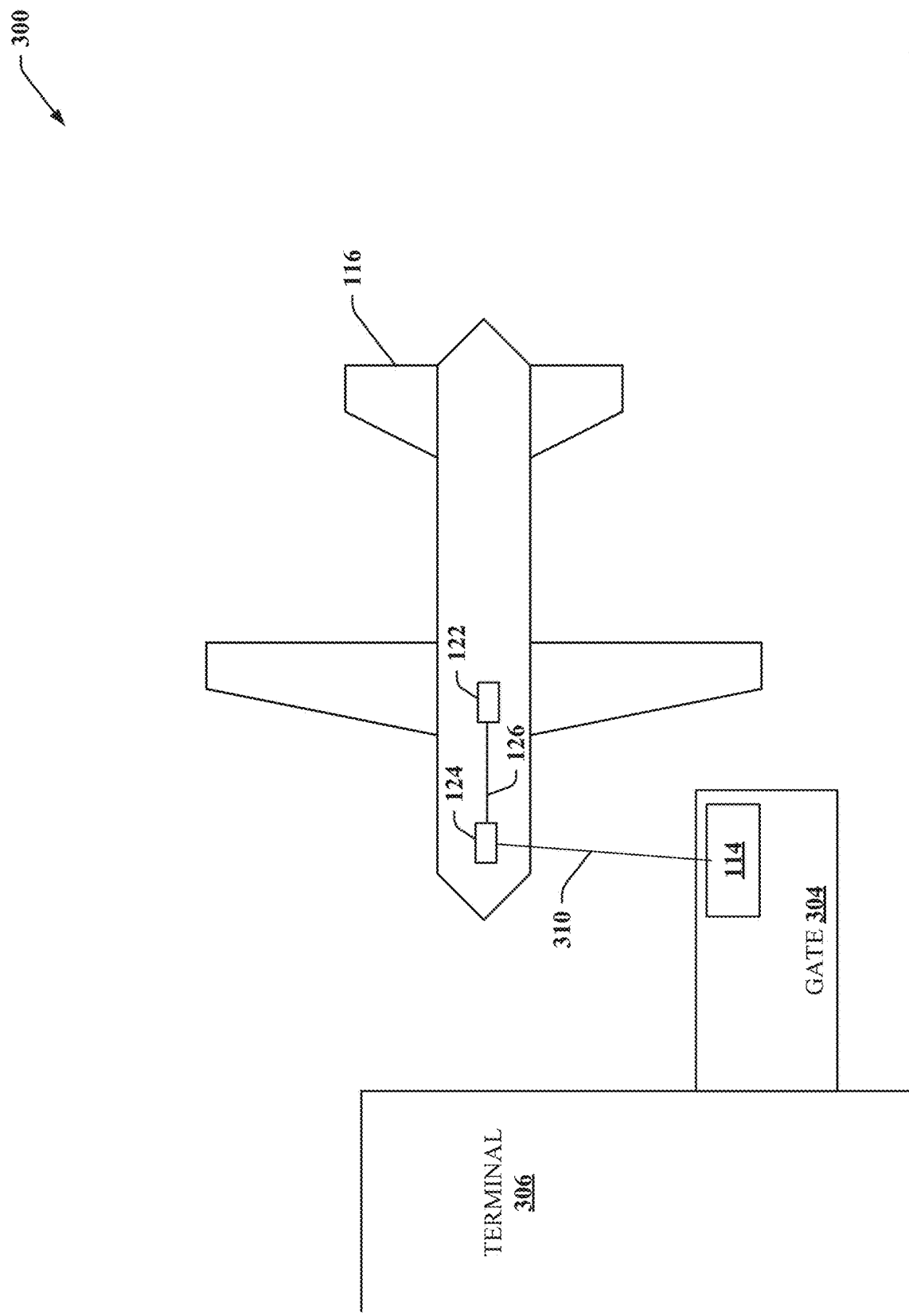

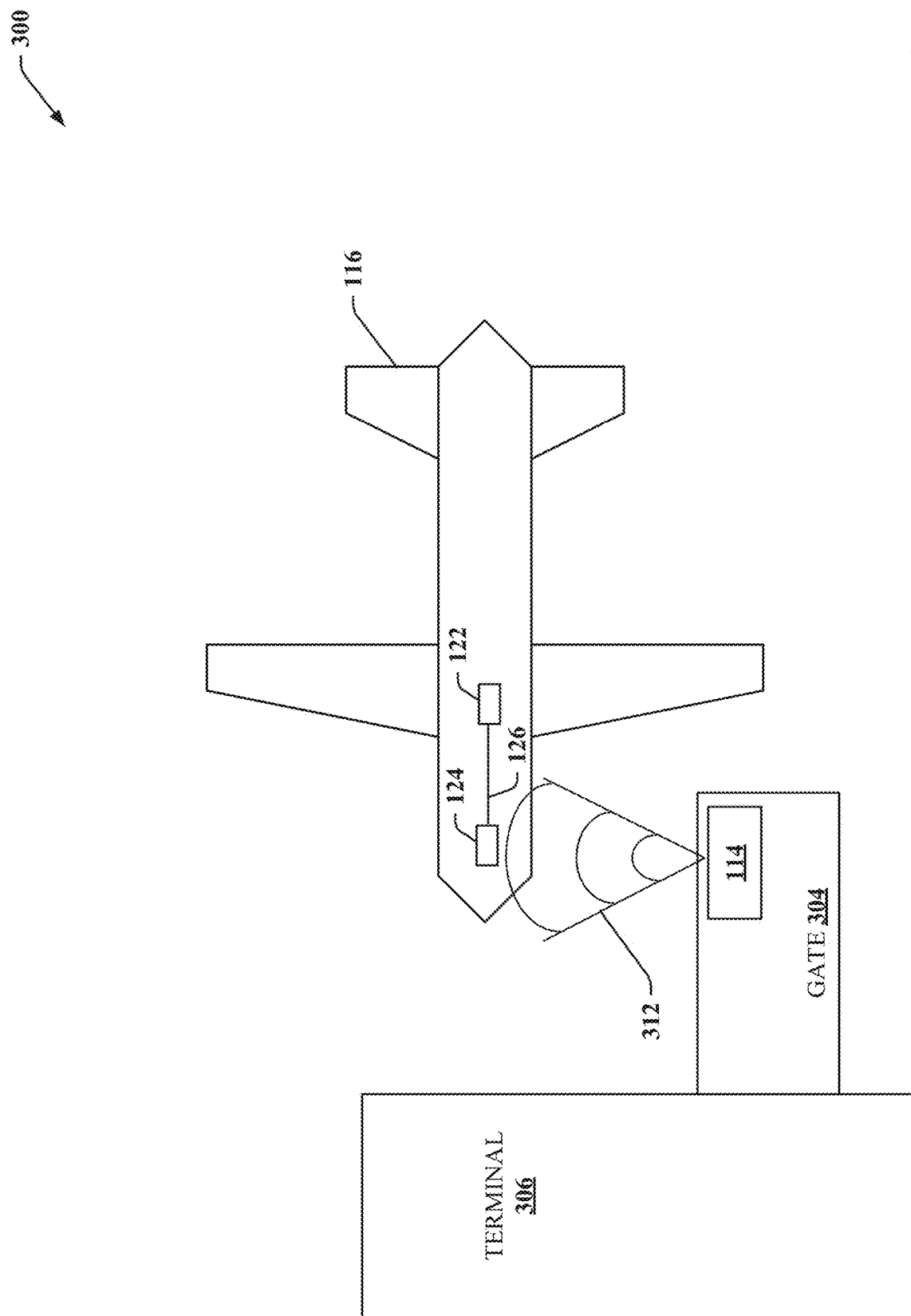

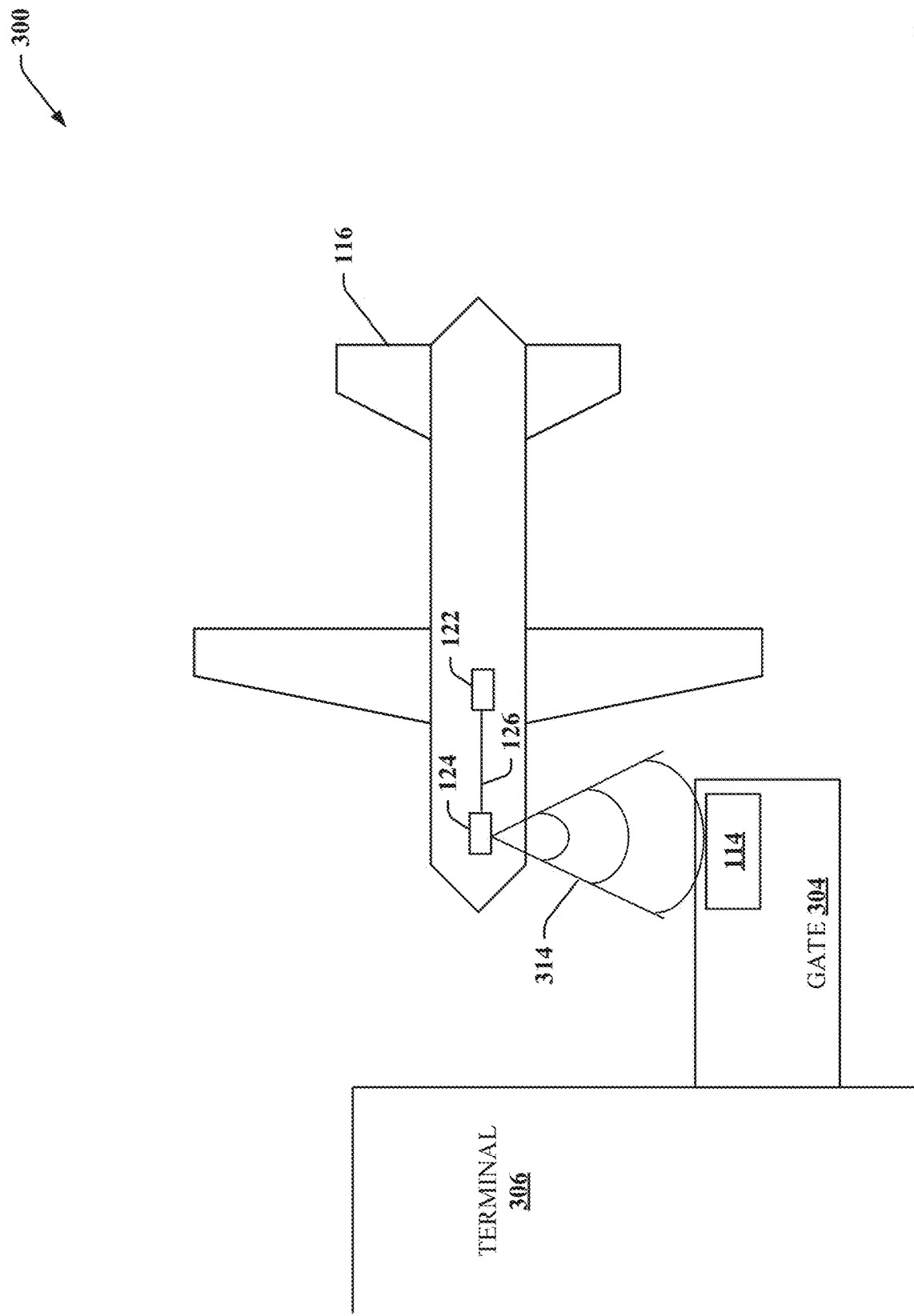

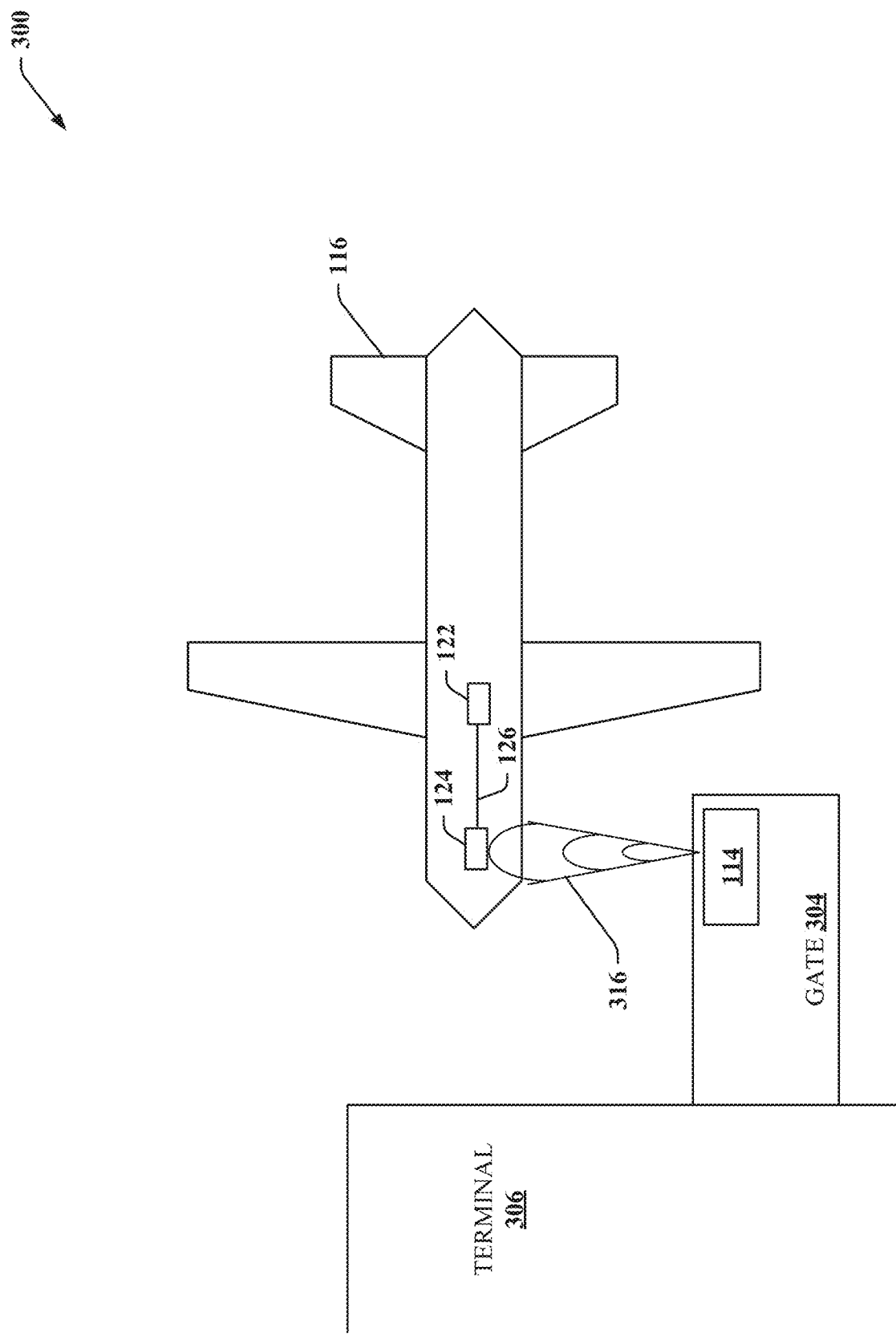

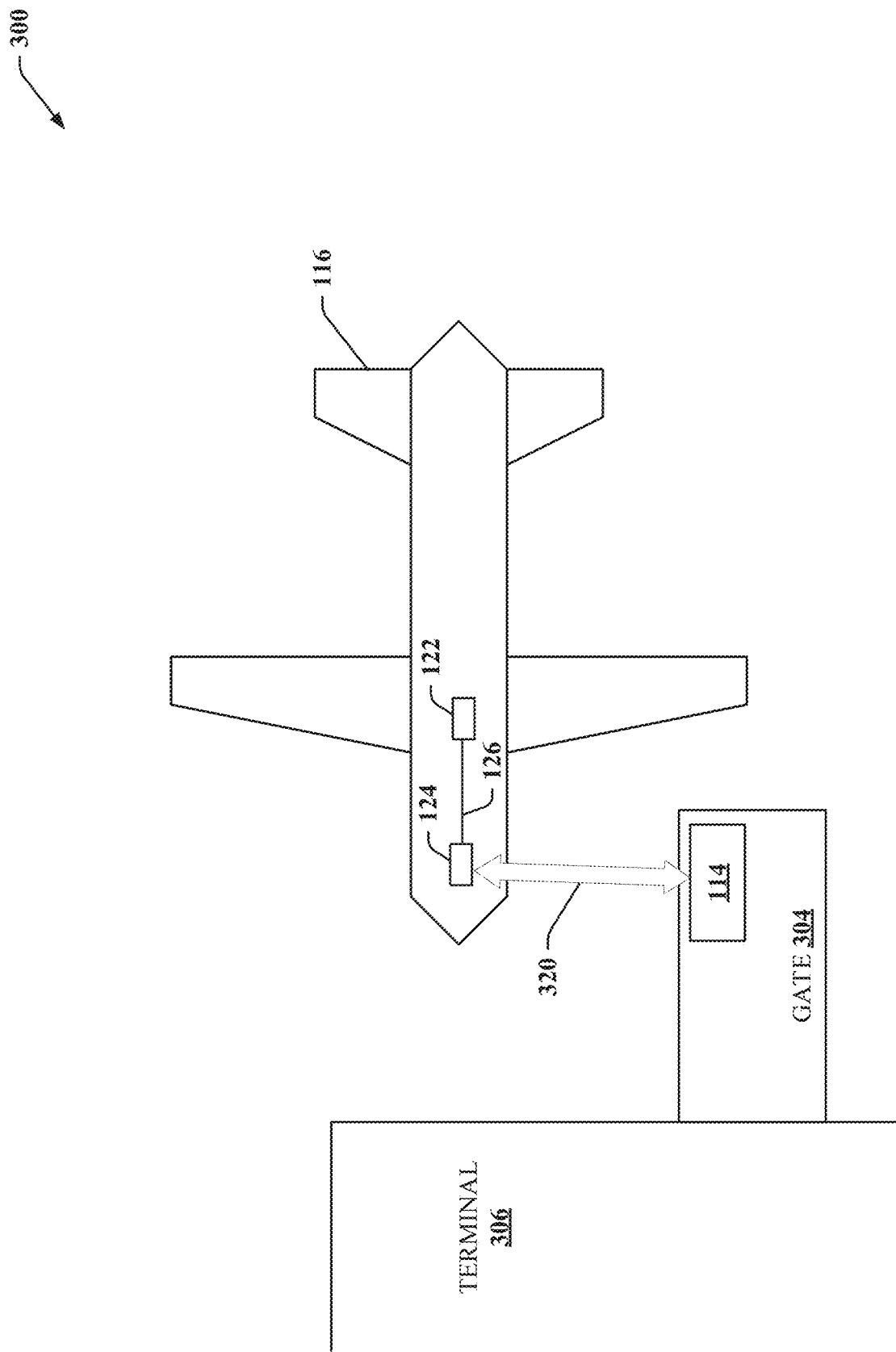

LINE OF SIGHT AIRCRAFT DATA TRANSFER SYSTEM

CROSS REFERENCE TO RELATED APPLICATIONS

This application is a continuation of, and claims priority to each of, U.S. patent application Ser. No. 15/603,049, filed on May 23, 2017, entitled "LINE OF SIGHT AIRCRAFT DATA TRANSFER SYSTEM", and now issued as U.S. Pat. No. 10/455,431. The entirety of the aforementioned application is hereby incorporated herein by reference.

TECHNICAL FIELD

The subject disclosure relates generally to line of sight aircraft data transfer communication, and particularly to employing high bandwidth narrow electromagnetic (EM) beam transmissions for communication between an aircraft on the ground and a communication system.

BACKGROUND

Aircraft can generate and store a vast amount of information during a flight that is useful for analysis after the flight. For example, during a flight, information is recorded in a flight data recorder, a cockpit voice recorder, a quick access recorder, as well as other computers, data loggers, sensing components, security video recorders, and any other suitable data recording devices. When the aircraft reaches the airport terminal or gate, some or all of this information is uploaded from the aircraft to a network data storage system for further analysis. Furthermore, increasing amounts of information are transferred to an aircraft when it is on the ground. For example, pre-flight data, maintenance data, device software or firmware updates, entertainment media, and any other suitable information that is downloaded to an aircraft on the ground.

Conventionally, a wired data line can be connected to the aircraft to perform these data transfers. However, this has many disadvantages, such as the time, manpower, and hardware needed to establish a physical data connection to the aircraft, as well as the additional associated maintenance of the equipment, wires, and data ports.

To alleviate some of these disadvantages, wireless communications have been employed to perform these data transfers using Wi-Fi (e.g., 802.11 based communications) or cellular communications. These same wireless communications mediums are also concurrently being employed by many passengers, businesses, and other aircraft in the airport. With the significant quantity of people (e.g. mobile devices), systems, and aircraft concurrently employing these wireless communications mediums, there can be considerable network congestion which degrades the data transfer bandwidths on the wireless communications mediums. Given the limited time that aircraft are on the ground before turning around for a next flight, the slow data transfer bandwidths oftentimes do not allow for transferring all of the data desired to be transferred between the aircraft and the network data storage system.

The above-described deficiencies of aircraft data transfer operations are merely intended to provide an overview of some of the problems of current technology, and are not intended to be exhaustive. Other problems with the state of the art, and corresponding benefits of some of the various non-limiting embodiments described herein, may become further apparent upon review of the following detailed description.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatus and/or computer program products that facilitate employing high bandwidth narrow electromagnetic (EM) beam transmissions for communication between an aircraft on the ground and a communication system are described.

According to an embodiment, a system is provided. The system can comprise a first directional antenna. The system can also comprise a memory that stores computer executable components. The system can further comprise a processor that executes the computer executable components stored in the memory. The computer executable components can comprise a location component configured to, in response to receiving a first signal from a first aircraft, determine a first line of sight that is unobstructed to a first antenna of the aircraft; and a communication component configured to, in response to the determination of the first line of sight, transmit a first highly directional beamformed electromagnetic (EM) signal from the first directional antenna along a line of sight based on the first line of sight to establish a first communication channel with the aircraft.

According to an embodiment, a method can comprise receiving, by a system operatively coupled to a processor, an omnidirectional transmission from an aircraft; determining, by the system, an unobstructed line of sight between an aircraft and a communication device; transmitting, by the system via the communication device, one or more first highly directional electromagnetic (EM) beam shaped transmissions along the unobstructed line of sight to the aircraft; receiving, by the system via the communication device, one or more second highly directional EM beam shaped transmissions along the unobstructed line of sight from the aircraft establishing, by the system, a wireless data connection having a defined bandwidth between the communication device and the aircraft using the one or more first highly directional EM beam shaped transmissions and the one or more second directional highly EM beam shaped transmissions; and transferring, by the system, aircraft data between the aircraft and the communication device using the wireless data connection.

According to yet another embodiment, a non-transitory computer-readable medium having instructions stored thereon that, in response to execution, can cause a communication device including a processor to perform operations comprising: determining a first line of sight that is unobstructed to an antenna of an aircraft; and establishing a wireless data connection having a defined data transfer rate between the aircraft and the communication device using highly directional electromagnetic (EM) beam shaped transmissions along the unobstructed line of sight; and transferring a defined amount of data between the aircraft and the communication device using the wireless data connection within a defined time window.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the drawings. It will also be appreciated that the detailed description may include additional or alternative embodiments beyond those described in this summary.

DESCRIPTION OF THE DRAWINGS

FIGS. 3A-3H illustrates a block diagram of a non-limiting example of establishing of a high-bandwidth data connection with an aircraft in accordance with one or more embodiments described herein.

DETAILED DESCRIPTION

Figure 1:
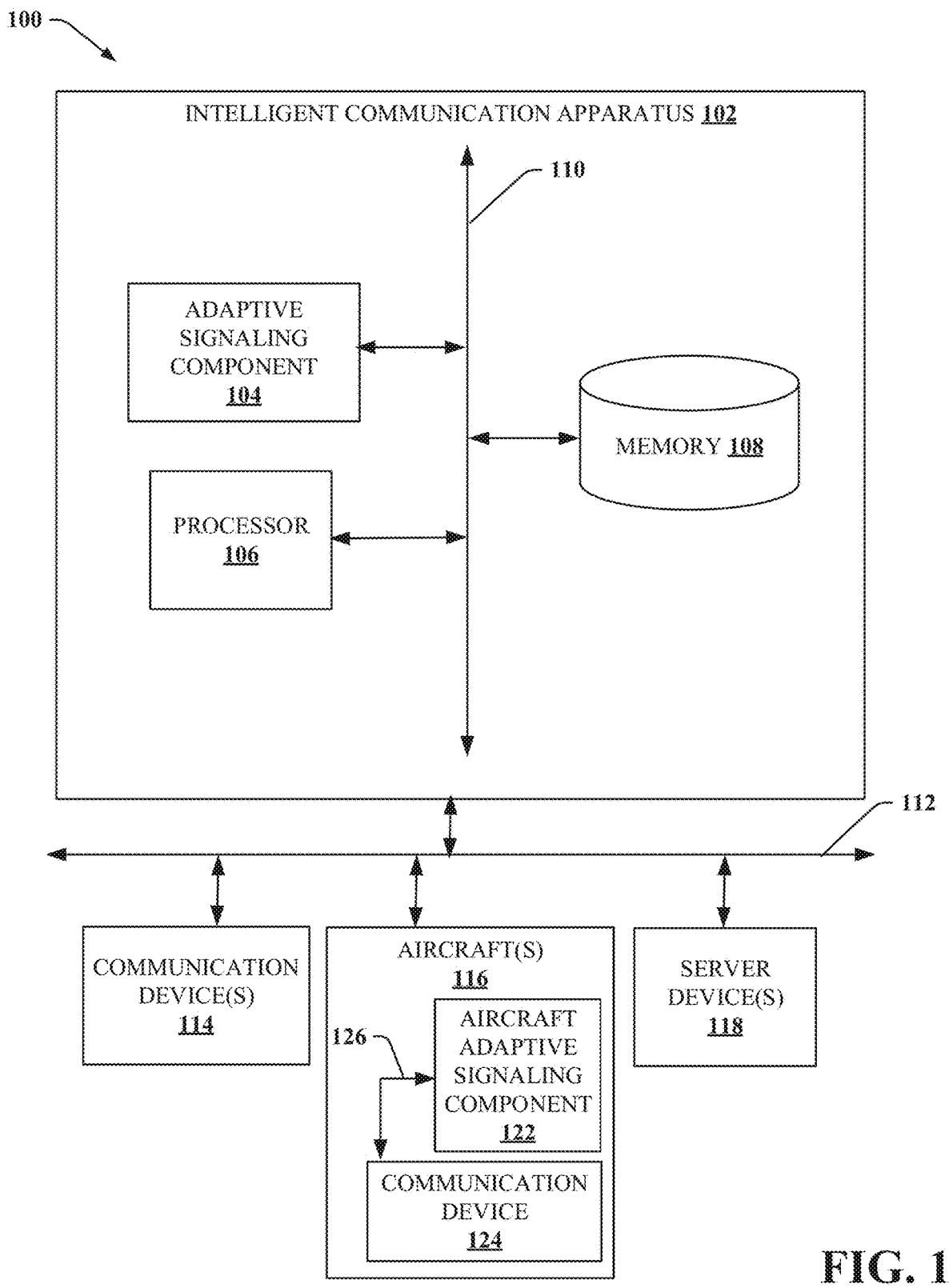
FIG. 1 illustrates a block diagram of an example, non-system that facilitates automated establishment of a high-bandwidth data connection with an aircraft using highly directional EM beam shaped transmissions along an unobstructed line of sight to the aircraft in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details. In other instances, well-known structures and devices are shown in block diagram form in order to facilitate describing the subject disclosure.

In order to overcome one or more disadvantages as described in the background, one or more embodiments disclosed herein can employ high bandwidth narrow electromagnetic (EM) beam transmissions for communication between an aircraft on the ground (e.g. at a gate at a terminal, on the tarmac, taxiing on a runway) and a communication system. For example, an aircraft on the ground can transmit an omnidirectional EM beam shaped signal with identifying information for the aircraft, which an intelligent communication system or apparatus receives. The intelligent communication system or apparatus can determine an unobstructed line of sight to the aircraft and establish a high-bandwidth data connection with the aircraft using a highly directional EM beam shaped signal along the unobstructed line of sight to the aircraft. Similarly, the aircraft can employ a highly directional EM beam shaped signal along the unobstructed line of sight to the intelligent communication system for the data connection. Using the highly directional EM beam shaped signals allows for transmitting signals at a higher power while reducing interference with other devices communications that can be sharing the same EM spectrum, and thus allow for much higher bandwidth communications using the highly directional EM beam shaped signals.

It is to be appreciated that a highly direction EM beam can have a defined focus (e.g. arc, area, width, height, size, or any other suitable dimension) such that the highly directional bean can ignore or reject EM traffic in progress in other EM beams transmitted in a defined area. For example, concurrently transmitted highly direction EM beams can operate very close to each other without interfering with each other. In a non-limiting example, a highly direction EM beam can have a focus within a range of 5 to 30 degrees. In another non-limiting example, a highly direction EM beam can have a focus within a range of 1 to 10 degrees. In an additional example, a highly direction EM beam can have a focus within a range of 3 to 7 degrees. In a further example, a highly direction EM beam can have a focus within a range of 1 to 5 degrees. It is to be appreciated that the focus defining a highly directional EM beam can depend on the EM spectrum of the highly directional EM beam.

In one or more other embodiments, a mesh network of communication nodes at the airport can establish a chained set of unobstructed lines of sight communication links using highly directional EM beam shaped signals, thus acting as repeaters to establish a data connection between an aircraft on the ground (e.g. on a taxiway, at a remote holding point on the tarmac, a parking area, a hanger, or any other suitable area) and the intelligent communication system or apparatus.

The computer processing systems, computer-implemented methods, apparatus and/or computer program products employ hardware and/or software to solve problems that are highly technical in nature (e.g., related to communication devices performing processing to establishing a high-bandwidth data connection using highly directional EM beam shaped transmissions between an aircraft and an intelligent communication system or apparatus, performing processing to dynamically maintain and handoff a high-bandwidth data connection using highly directional EM beam shaped transmissions between a moving aircraft and an intelligent communication system or apparatus, etc.), that are not abstract and that cannot be performed as a set of mental acts by a human. One or more embodiments of the subject computer processing systems, methods, apparatuses and/or computer program products enable communication devices to employ artificial intelligence to coordinate amongst themselves, and optionally with other devices, to perform actions to establishing a high-bandwidth data connection using highly directional EM beam shaped transmissions between an aircraft and an intelligent communication system or apparatus, and dynamically maintain and handoff a high-bandwidth data connection using highly directional EM beam shaped transmissions between a moving aircraft and an intelligent communication system or apparatus.

The highly directional nature of a beam-shaped EM transceiver enables very high data bandwidth capability while utilizing only a fraction of the power of an omnidirectional implementation; while at the same time reducing the overall spectrum congestion in the airport environment. Additionally, the highly directional nature of the transmission and reception of beam-shaped EM energy provides significant isolation from other wireless data network systems and clients in the airport environment. Additionally, the highly directional beam-shaped EM beam requires a physically smaller antenna due to the higher field strength at the receiving end of the transmission as well as the attenuation on any off-axis signals. Due to the aerodynamic drag of any antenna system on an aircraft, a smaller antenna is preferred on aircrafts. In addition, the use of line of sight capability allows for the use of high frequency, low power antennas to be located within the aircraft utilizing an open doorway to establish the line-of-sight capability, which can minimize the overall product and installation cost. Therefore, the highly directional beam-shaped EM transceiver system enables high-performance wireless data network capability that can support the exchange of all of the required post and pre-flight data, thereby reducing fleet and operational risks as well as aircraft operational costs.

While examples herein refer to aircraft at an airport for illustrative purposes, it is to be appreciated that the novel concepts disclosed herein can be employed for any type of vehicle that has a significant amount of data transfer requirements to a remote data storage system. For example, law enforcement vehicles and/or body cameras record a large amount of audio and video data that needs to be uploaded to a data storage system when the officer returns to the law enforcement station (e.g. police station). A high-speed data connection can be established between the law enforcement vehicle and/or body camera to transfer data to/from an intelligent communication system or apparatus at the law enforcement station. In another example, a watercraft arriving/departing at a port, marina, and/or inland waterway can transfer data at high-speed to/from an intelligent communication system or apparatus at a terminal in the port, marina, and/or inland waterway. In a further example, a truck arriving/departing a delivery location, a pickup location, and/or a truck stop can transfer data at high-speed to/from an intelligent communication system or apparatus at the delivery location, pickup location, and/or truck stop. In an additional example, a bus arriving/departing at a bus station transfer data at high-speed to/from an intelligent communication system or apparatus at the bus station. In another example, a train arriving/departing at a railyard can transfer data at high-speed to/from an intelligent communication system or apparatus at the railyard.

FIG. 1 illustrates a block diagram of an example, non-limiting system 100 that facilitates automated establishment of a high-bandwidth data connection with the aircraft using highly directional EM beam shaped transmissions along an unobstructed line of sight to the aircraft in accordance with one or more embodiments described herein. Repetitive description of like elements employed in other embodiments described herein is omitted for sake of brevity. Aspects of systems (e.g., system 100 and the like), apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., one or more computers, one or more computing devices, one or more virtual machines, etc., can cause the one or more machines to perform the operations described.

As shown in FIG. 1, the system 100 can include an intelligent communication apparatus 102, one or more communication devices 114, one or more networks 112, one or more aircraft 116, and one or more server devices 118.

Intelligent communication apparatus 102 can include or otherwise be associated with at least one memory 108 that can store computer executable components (e.g., computer executable components can include, but are not limited to, the adaptive signaling component 104, and associated components). Intelligent communication apparatus 102 can also include or otherwise be associated with at least one processor 106 that executes the computer executable components stored in the memory 108. Intelligent communication apparatus 102 can further include a system bus 110 that can couple the various components including, but not limited to, adaptive signaling component 104, memory 108, processor 106, and/or other components. While intelligent communication apparatus 102 is shown in FIG. 1 to include adaptive signaling component 104, in other embodiments, any number of different types of devices can be associated with or include all or some of the components of adaptive signaling component 104. For example, communication device 114 and/or server device 118 can include all or some of the components of adaptive signaling component 104. All such embodiments are envisaged.

Communication device 114 can include any device capable of communicating via a wired or wireless connection. For example, communication device 114 can include one or more processors, one or more memories, one or more transceivers, one or more antennae (e.g., an omnidirectional antenna, a dipole antenna, a directional antenna, a highly directional antenna, a patch array antenna, a Yagi antenna, a sector antenna, or any other suitable type of antenna), and any other suitable components for receiving and transmitting data via a wired or wireless connection. While communication device 114 is shown in FIG. 1 to be a separate device from intelligent communication apparatus 102 and server device 118, intelligent communication apparatus 102 and/or server device 118 can include communication device 114. All such embodiments are envisaged.

Aircraft 116 can include any aircraft 116 that employ an aircraft port (e.g., airport, terminal, ground landing area, building top landing pad, aircraft carrier ship, tarmac, runway, hanger, or any other suitable aircraft port), non-limiting examples of which include commercial aircraft, non-commercial aircraft, military aircraft, government aircraft, and/or any other suitable aircraft that employ an aircraft port. Aircraft 116 can include aircraft adaptive signaling component 122, which can include all of some of the functionality of adaptive signaling component 104. In addition, aircraft 116 can include communication device 124, which can include all of some of the functionality of communication device 114. Aircraft 116 can include one or more wired and/or wireless communication networks 126 which communicatively connect aircraft adaptive signaling component 122 and communication device 124. While communication device 114 is shown in FIG. 1 to be a separate device from aircraft adaptive signaling component 122, aircraft adaptive signaling component 122 can include communication device 124. All such embodiments are envisaged.

Server device 118 can be any computing device that can be communicatively coupled to intelligent communication apparatus 102, communication device 114, and/or aircraft 116, non-limiting example of which can include a server computer, a computer, a mobile computer, a control system, an air traffic control system, a collision avoidance system, a ground control system, a weather computer, an emergency system, a communication system, a warning system, a radar system, a traffic system, a data analysis system, ground equipment, safety equipment, vehicles, a jetway control device, a communication device, and/or any other suitable computing device. It is to be appreciated that intelligent communication apparatus 102, communication device 114, aircraft 116, and server device 118 can be equipped with communication hardware and/or software that enable communication amongst intelligent communication apparatus 102, communication device 114, aircraft 116, and server device 118.

The various components (e.g., adaptive signaling component 104, memory 108, processor 106, aircraft 116, communication device(s) 114, server device(s) 118, and/or other components) of system 100 can be connected either directly or via one or more networks 112. Such networks 112 can include wired and wireless networks, including, but not limited to, a cellular network, a wide area network (WAN) (e.g., the Internet), and/or a local area network (LAN). Wireless networks can include any suitable wireless communication medium, non-limiting examples of which include, electromagnetic (EM), cellular, WAN, wireless fidelity (Wi-Fi), W-Max, WLAN, Li-Fi, radio communication, microwave communication, satellite communication, optical communication, sonic communication, electromagnetic induction communication, and/or any other suitable wireless communication technology. It is to be appreciated that in establishing a data connection and or communication channel, any suitable communication protocol and/or authentication mechanism can be employed in embodiments disclosed herein.

Figure 2:
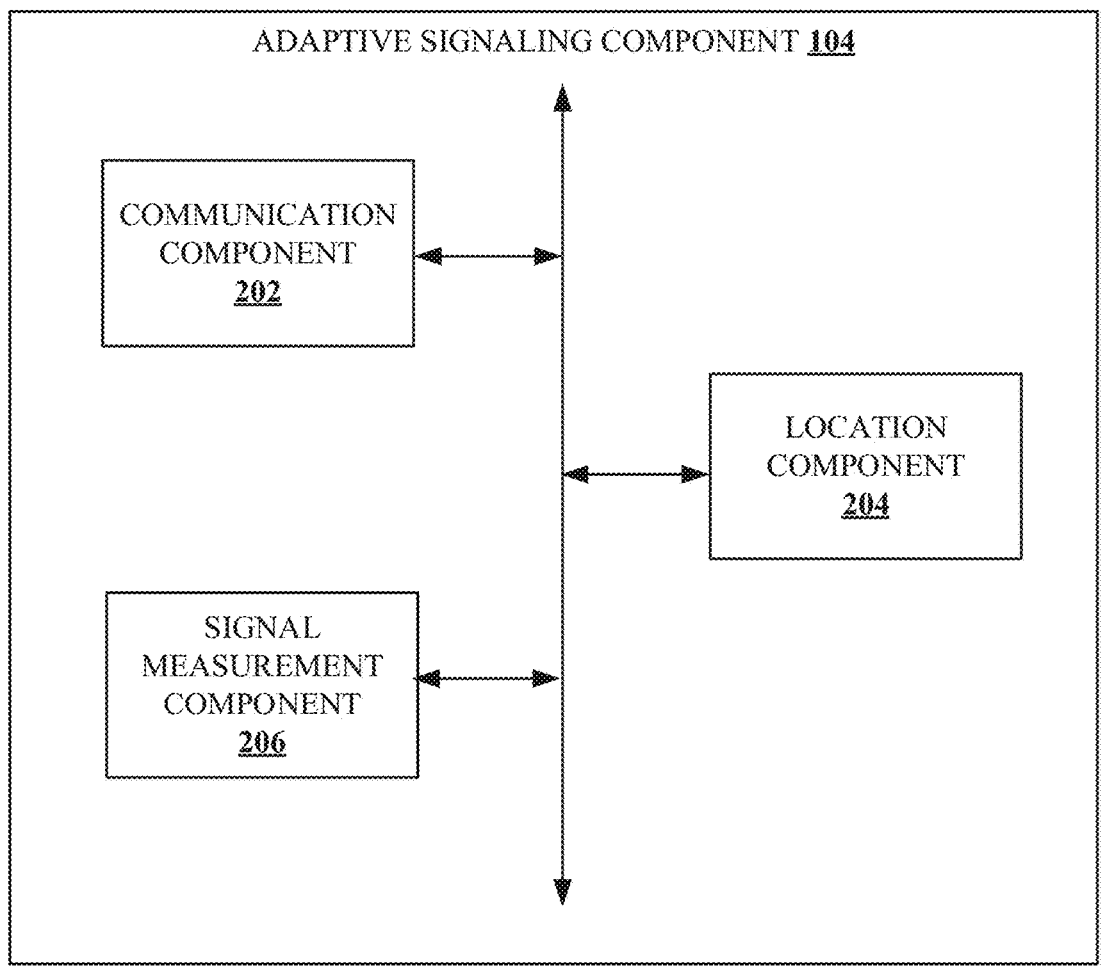
FIG. 2 illustrates a block diagram of an example, non-limiting adaptive signaling component that can establish of a high-bandwidth data connection with an aircraft using a highly directional EM beam shaped signal along an unobstructed line of sight to the aircraft in accordance with one or more embodiments described herein.

FIG. 2 illustrates a block diagram of an example, non-limiting adaptive signaling component 104 that can establish of a high-bandwidth data connection with aircraft 116 using a highly directional EM beam shaped signal along an unobstructed line of sight to the aircraft 116 in accordance with one or more embodiments described herein. Repetitive description of like elements employed in other embodiments described herein is omitted for sake of brevity. Furthermore, while examples herein disclose aircraft 116 initiating communication with intelligent communication apparatus 102 using an omnidirectional beam signal, it is to be appreciated that in one or more embodiments, intelligent communication apparatus 102 can initiate communication with aircraft 116 using an omnidirectional beam signal or a directional beam signal.

In some embodiments, adaptive signaling component 104 can include communication component 202 that manages data connections and controls EM transmission beam characteristics (e.g. parameters), such as in a non-limiting example, shape, size, power, frequency, or any other suitable characteristic of an EM transmission beam. Adaptive signaling component 104 can also include location component 204 that can determine an unobstructed line of sight from a communication device 114 of intelligent communication apparatus 102 and communication device 124 of aircraft 116. Adaptive signaling component 104 can include signal measurement component 206 that can determine quality metrics of an EM transmission beam.

Figure 3B:
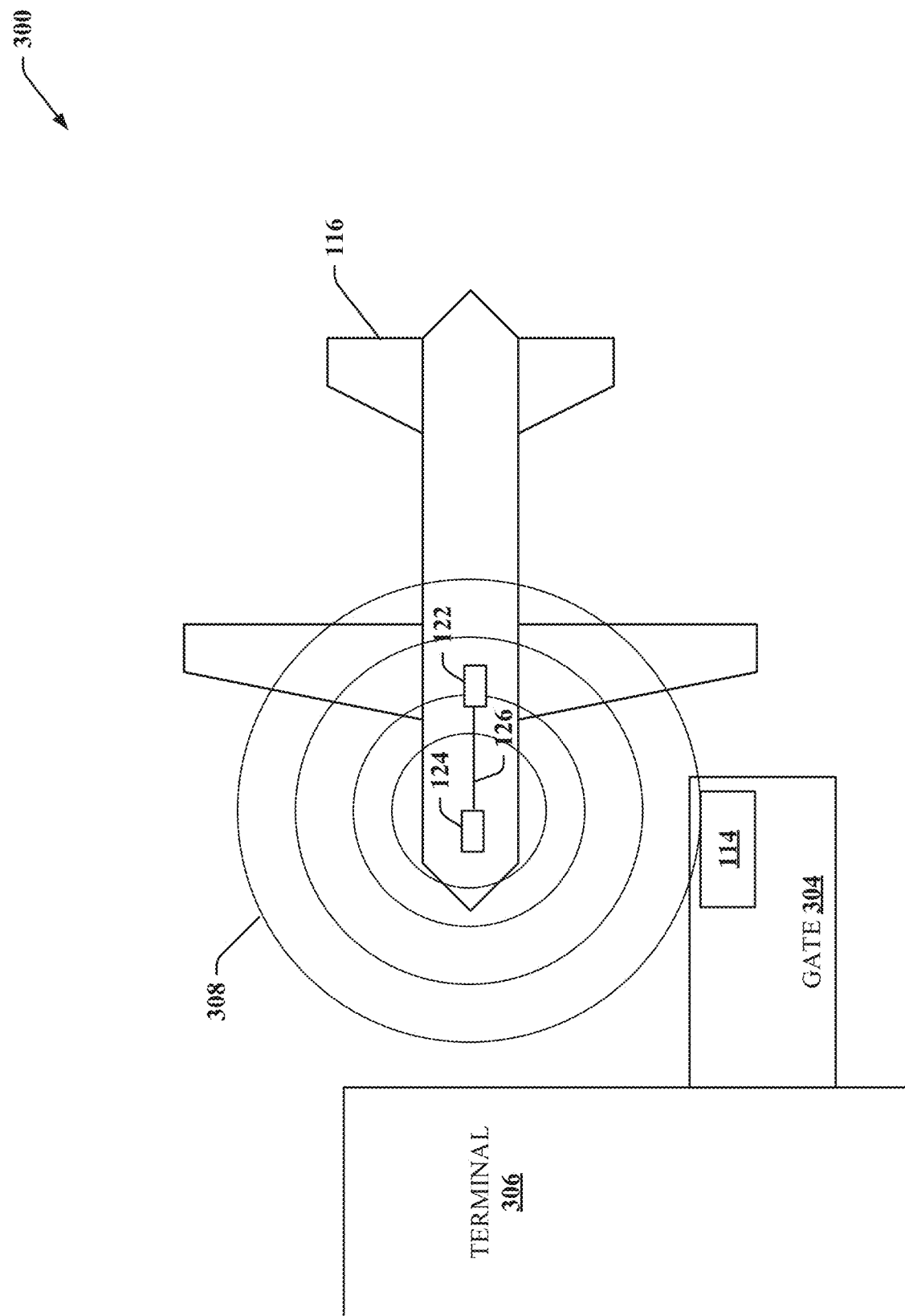

FIGS. 3A to 3H illustrates a block diagram of an example, non-limiting establishing of a high-bandwidth data connection between an aircraft 116 and intelligent communication apparatus 102 using a highly directional EM beam shaped signal along an unobstructed line of sight from a communication device 114 of intelligent communication apparatus 102 and communication device 124 of aircraft 116 in accordance with one or more embodiments described herein. In FIG. 3A, an airport 300 has a terminal 306 having a gate 304 with a communication device 114. At gate 304, aircraft 116 is parked.

In FIG. 3B, aircraft 116 can send omnidirectional EM beam shaped transmission 308 via aircraft adaptive signaling component 122 and communication device 124. Communication component 202 can receive the omnidirectional EM beam shaped transmission 308 through communication device 114. Communication component 202 can instruct location component 204 to determine an unobstructed line of sight between communication device 114 and communication device 124. Location component 204 can employ any suitable mechanism for determining the unobstructed line of sight, non-limiting examples of which can include Global Positioning System (GPS) data, signal triangulation, image analysis, or any other suitable location mechanism. For example, omnidirectional EM beam shaped transmission 308 can include GPS data identifying GPS coordinates of communication device 124. In another example, signal measurement component 206 can determine signal characteristics of omnidirectional EM beam shaped transmission 308 (and/or one or more other signals from aircraft 116) that are employed by location component 204 to determine an unobstructed line of sight between communication device 114 and communication device 124. In a further example, location component can employ one or more instruments (not shown), such as in a non-limiting example, a camera to capture one or more images that are analyzed by location component 204 to determine an unobstructed line of sight between communication device 114 and communication device 124.

FIG. 3C depicts a line of sight 310 between communication device 114 and communication device 124 determined by location component 204.

Communication component 202 can send a highly directional EM beam shaped transmission 312 as depicted in FIG. 3D along the unobstructed line of sight between communication device 114 and communication device 124. In a non-limiting example, the size of the highly directional EM beam shaped transmission 312 can start at first predefined size, such as 30 degrees (e.g. +/−15 degree window around a center point) or any other suitable size, and can narrow as further communications occur based on quality metrics associated with the data connection and/or signal characteristics. It is to be appreciated that communication component 202 can adjust (e.g. narrow, expand, change the shape, etc.) the size of the highly directional EM beam shaped transmission to achieve defined values of the quality metrics as further communications occur.

In response, aircraft adaptive signaling component 122 and communication device 124 can send a highly directional EM beam shaped transmission 314 as depicted in FIG. 3E along the unobstructed line of sight between communication device 124 and communication device 114. In an embodiment, aircraft adaptive signaling component 122 can receive information describing the line of sight between communication device 124 and communication device 114 from communication component 202. In another embodiment, aircraft adaptive signaling component 122 can determine the line of sight between communication device 124 and communication device 114 similar to adaptive signaling component 104. Communication component 202 and aircraft adaptive signaling component 122 can exchange one or more highly directional EM beam shaped transmissions 312 and/or 314 to establish a high-bandwidth data connection between an aircraft 116 and intelligent communication apparatus 102. It is to be appreciated that in establishing the high-bandwidth data connection, any suitable communication protocol and/or authentication mechanism can be employed.

As the one or more highly directional EM beam shaped transmissions 312 and/or 314 occur, signal measurement component 206 can determine quality metrics associated with the highly directional EM beam shaped transmissions 312 and/or 314, non-limiting example of which can include interference, bandwidth, throughput, latency, signal-to-noise ratio, jitter, error rate, or any other suitable transmission quality metric. Communication component 202 and/or aircraft adaptive signaling component 122 can employ the quality metrics to adjust characteristics of the highly directional EM beam shaped transmissions 312 and/or 314 using any suitable algorithm to optimize any combination of the quality metrics. For example, communication component 202 and/or aircraft adaptive signaling component 122 can narrow and/or expand the respective focal arcs, adjust power levels, adjust patterns, or adjust any other characteristic of highly directional EM beam shaped transmissions 312 and/or 314 to achieve an optimal high bandwidth at which interference meets a predefined threshold. In a non-limiting example, the focal arc of a highly directional EM beam shaped transmission can be adjusted within a range of 5-30 degrees to obtain an optimal high bandwidth. In an embodiment, the focal arc is started at a higher degree and narrowed to achieve the optimal bandwidth. In another embodiment, the focal arc is started at a smaller degree and expanded to achieve the optimal bandwidth. It is to be appreciated that characteristics of highly directional EM beam shaped transmissions 312 and/or 314 can be dynamically adjusted in real-time as additional information contributing to determination of quality metrics is obtained by signal measurement component 206.

FIG. 3F depicts a non-limiting example where highly directional EM beam shaped transmission 312 has been narrowed to form highly directional EM beam shaped transmission 316 along the unobstructed line of sight between communication device 114 and communication device 124.

Figure 3G:
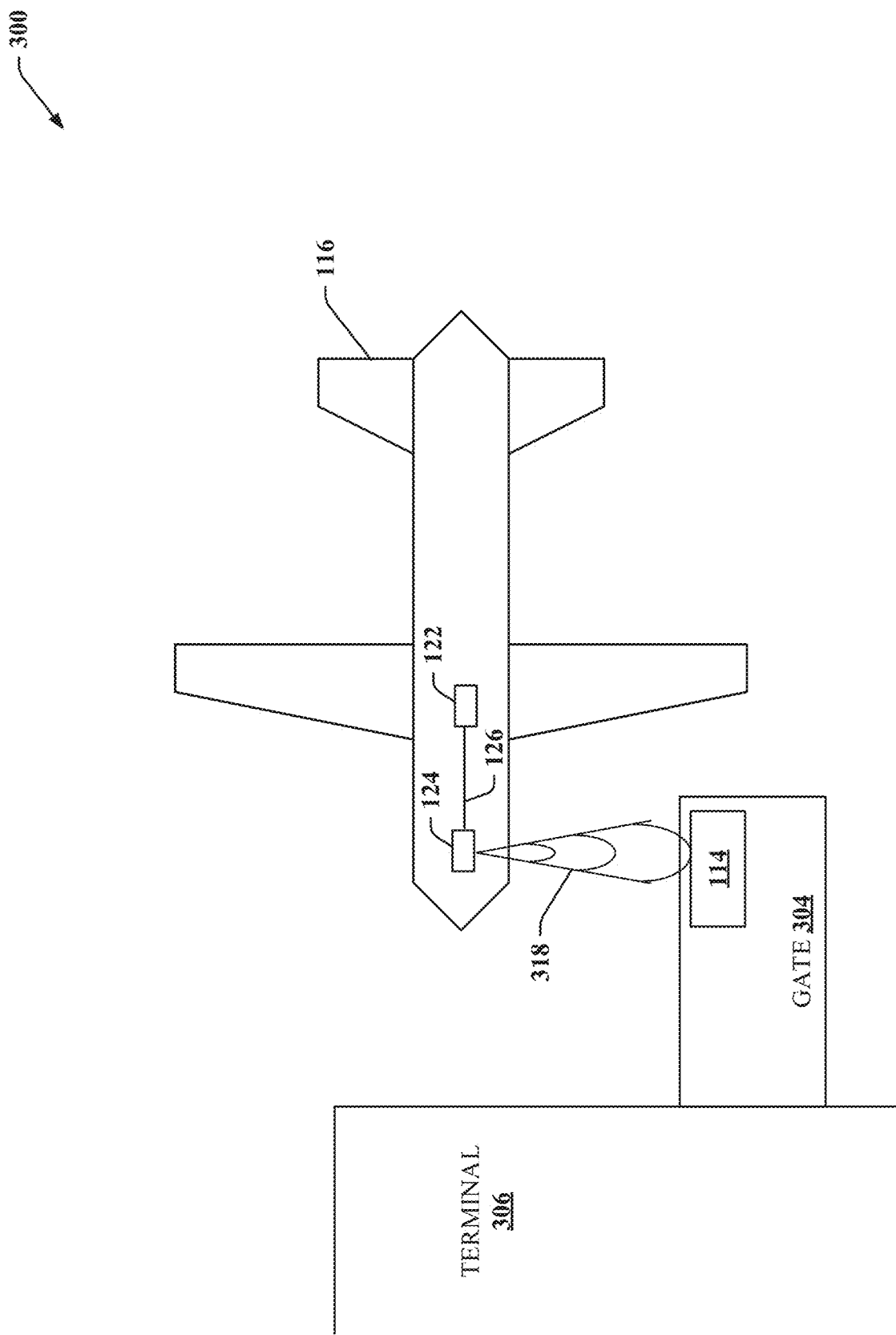

FIG. 3G depicts a non-limiting example where highly directional EM beam shaped transmission 314 has been narrowed to form highly directional EM beam shaped transmission 318 along the unobstructed line of sight between communication device 124 and communication device 114.

FIG. 3H depicts a non-limiting example a high-bandwidth data connection 320 between an aircraft 116 and intelligent communication apparatus 102 has been established using highly directional EM beam shaped transmissions along an unobstructed line of sight between communication device 114 of intelligent communication apparatus 102 and communication device 124 of aircraft 116 in accordance with one or more embodiments described herein.

It is to be appreciated that communication component 202 (and/or aircraft adaptive signaling component 122) can employ artificial intelligence to make determinations regarding adjustments to characteristics of the highly directional EM beam shaped transmissions using information related to aircraft 116 information, aircraft 116 arrival/departure timetables, airport information, EM spectrums congestion information, antennae location information, and/or any other suitable information that can impact transmission quality metrics. In an example, communication component 202 can employ an aircraft 116 arrival/departure timetable to determine a time window that an aircraft 116 will be at gate 304. Based on the determined time window, communication component 202 can determine a required bandwidth to complete data transfer to and/or from aircraft 116 within the time window, and make adjustments to one or more characteristics of the highly directional EM beam shaped transmission to meet the required bandwidth. For example, an international flight can have a multi-hour (e.g. 4 hours) turnaround time at the gate and thus needing less bandwidth over a longer time to complete data transfers, while a commuter flight can have a few minutes (e.g 20 minutes) before leaving the gate and thus needing high bandwidth for a shorter period of time to complete data transfers.

In another example, communication component 202 can determine aircraft 116 information describing characteristics of aircraft 116, such as in a non-limiting plane model/type, carrier, destination, origin, or any other suitable information describing the aircraft. Based on the aircraft 116 information, communication component 202 can determine amount of data that needs to be transferred to and/or from aircraft 116, and make adjustments to one or more characteristics of the highly directional EM beam shaped transmission to meet the required amount of data that needs to be transferred to and/or from aircraft 116. For example, a larger plane can have more information recorded in-flight than a smaller plane, and thus can require higher bandwidth than the smaller aircraft for the same time window at the gate.

In an additional example, communication component 202 can determine EM spectrums congestion information describing amounts of congestion on different EM spectrums that are being employed for communication at airport 300. Based on the EM spectrums congestion information, communication component 202 can determine an EM spectrum and/or protocol to employ for the highly directional EM beam shaped transmission that avoids interference with congested EM spectrums. For example, communication component 202 can adjust directional transmission beam shape, frequency, power, protocol (e.g. Time Division Multiple-Access (TDMA) protocol, Code Division Multiple-Access (TDMA), Global System for Mobile (GSM), Long Term Evolution (LTE), or any other suitable wireless communication protocol), or any other suitable characteristic of the directional transmission beam.

In another example, communication component 202 can adjust timing of establishing the highly directional EM beam shaped transmissions for an aircraft 116 based on a determination that a door of the aircraft has opened. For example, aircraft manufacturers can have a preference to avoid placing unnecessary objects on the outside surface of an aircraft 116 to avoid additional aerodynamic drag in flight. Also, the highly directional beams require a physically smaller antenna due to the higher field strength at the receiving end of the transmission as well as the attenuation on any off-axis signals. As such, an aircraft can have an antenna for communication device 124 located within the aircraft 116 cabin, such as near a door. Therefore, to avoid unnecessary interference, communication component 202 can wait to establish the highly directional EM beam shaped transmissions for aircraft 116 until communication component 202 has determined that the door of aircraft 116 is open and the high bandwidth data connection can be established. In an example, communication component 202 determine that the door has opened based on a signal from aircraft 116 indicating that the door is open. In another example, communication component 202 employ a sensor, such as a camera, to determine that the door of aircraft 116 is open. It is to be appreciated that communication component 202 can employ any suitable mechanism to determine that the door of aircraft 116 is open. Furthermore, the unobstructed line of sight can be directed between the communication device 114 and the open door of aircraft 116.

Furthermore, communication component 202 can adjust highly directional EM beam shaped transmissions for a set of aircraft 116 to optimize transmission quality metrics across the set of aircraft 116 using any suitable algorithm.

Additionally, communication component 202 can employ a utility (e.g., cost/benefit) analysis in determining adjustments to characteristics of the highly directional EM beam shaped transmission for an aircraft 116 to optimize transmission quality metrics related to data transfer to and/or from aircraft 116. Moreover, communication component 202 can employ learning algorithms using information relating to current and/or previous adjust highly directional EM beam shaped transmissions for one or more aircrafts 116, aircraft 116 information, aircraft 116 arrival/departure timetables, airport information, EM spectrums congestion information, antennae location information, and/or any other suitable information that can be employed by communication component 202 to learn models for determining adjustments to characteristics of the highly directional EM beam shaped transmission for an aircraft 116 to optimize transmission quality metrics related to data transfer to and/or from aircraft 116.

Figure 4:
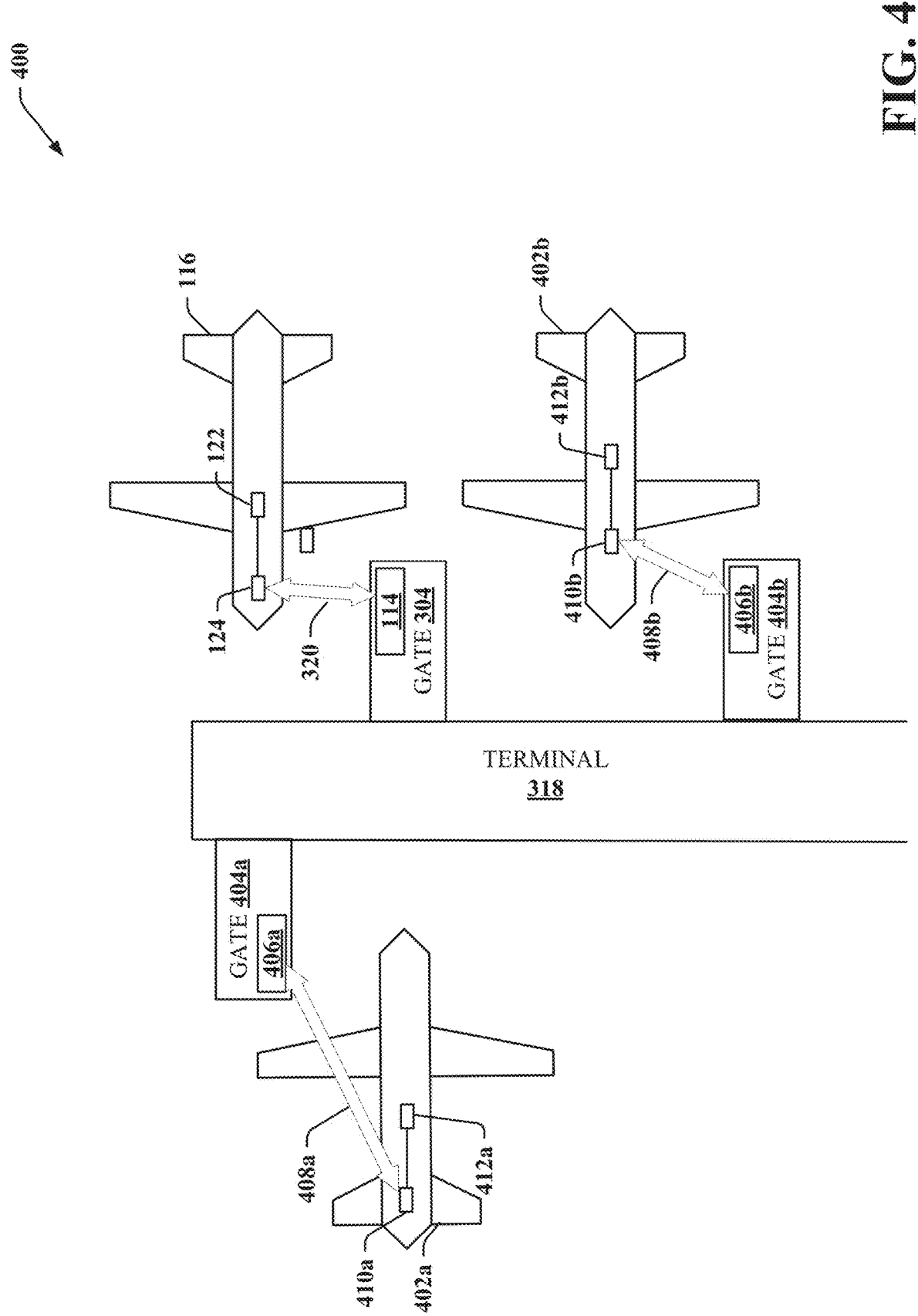
FIG. 4 illustrates a block diagram of a non-limiting example of establishing of concurrent high-bandwidth data connections with a of plurality aircraft in accordance with one or more embodiments described herein.

FIG. 4 illustrates a block diagram of an example, non-limiting establishing of a high-bandwidth data connection between a plurality of aircrafts and intelligent communication apparatus 102 using respective highly directional EM beam shaped signals along unobstructed lines of sight to the plurality of aircrafts in accordance with one or more embodiments described herein. Airport 400 includes terminal 318 with gate 304 and aircraft 116 as depicted in FIG. 3, with the addition of gate 404a at which aircraft 402a is parked, and gate 404b at which aircraft 402b is parked. A high-bandwidth data connection 320 is established between aircraft 116 and intelligent communication apparatus 102 using highly directional EM beam shaped transmissions along an unobstructed line of sight between communication device 114 and communication device 124. In addition, a high-bandwidth data connection 408a is established between aircraft 402a and intelligent communication apparatus 102 using highly directional EM beam shaped transmissions along an unobstructed line of sight between communication device 410a and communication device 406a. Noted that communication device 410a is located near the rear of aircraft 402a. Additionally, a high-bandwidth data connection 408b is established between aircraft 402b and intelligent communication apparatus 102 using highly directional EM beam shaped transmissions along an unobstructed line of sight between communication device 410b and communication device 406b. Communication component 202 can adjust characteristics of the highly directional EM beam shaped transmissions to optimize transmission quality metrics associated with high-bandwidth data connections 320, 408a, and 408b. For example, communication component 202 can maximize bandwidths on high-bandwidth data connections 320, 408a, and 408b while minimizing interference between high-bandwidth data connections 320, 408a, and 408b.

It is to be appreciated that while airport 400 depicts a single terminal, three gates, and three aircrafts, any number of terminals, gates, and aircrafts can be employed with respective highly directional EM beam shaped signals along unobstructed lines of sight for concurrent high-bandwidth data connections.

Furthermore, it is to be appreciated that a single communication device 114 can establish multiple high-bandwidth data connection using highly directional EM beam shaped transmissions with a plurality of aircraft 116.DET In some embodiments, an aircraft 116 may not be within a transmission distance of and/or have an unobstructed line of sight to communication device 114. This may at smaller airport, business jet airports, or at holding areas of larger airports. For example, a plane on a taxiway, at a remote holding point on the tarmac, a parking area, a hanger, or any other suitable area may be too far from the terminal to establish an unobstructed line of sight for a direct high-bandwidth data connection to the terminal. In this case, multiple communication devices 114 can form a mesh network that employ chained links of high-bandwidth data connections between aircraft 116 and intelligent communication apparatus 102.

Figure 5:
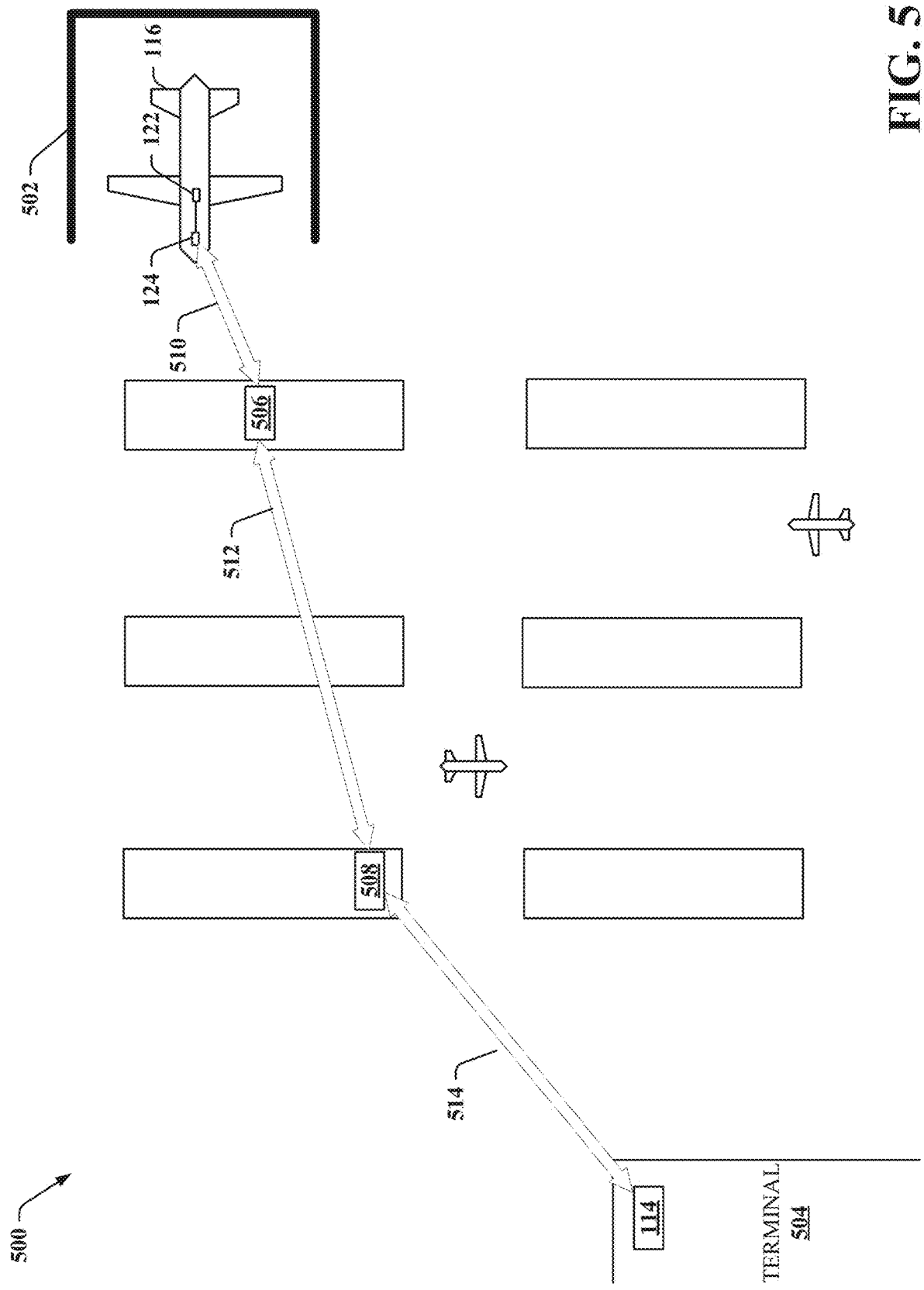
FIG. 5 illustrates a block diagram of a non-limiting example of establishing of high-bandwidth data connections with a of plurality aircraft using a mesh repeater network in accordance with one or more embodiments described herein.

FIG. 5 illustrates a block diagram of an example, non-limiting establishing of a high-bandwidth data connection between an aircraft 116 and intelligent communication apparatus 102 using a plurality of chained high-bandwidth data connections along unobstructed lines of sight between the aircraft 116, and communication devices 114, 506, and 508 in accordance with one or more embodiments described herein. Airport 500 includes a remote holding location 502 for aircraft 116, a terminal 504 with communication device 114, and communication devices 506 and 508 which can be substantially similar in form and/or functionality to communication device 114. Aircraft 116 can establish high-bandwidth data connection 510 using highly directional EM beam shaped transmissions between communication device 124 and communication device 506, communication device 506 can establish high-bandwidth data connection 512 using highly directional EM beam shaped transmissions with communication device 508, and communication device 508 can establish high-bandwidth data connection 514 using highly directional EM beam shaped transmissions with communication device 114. In this manner, aircraft 116 can establish a high-bandwidth data connection with intelligent communication apparatus 102 using the chained high-bandwidth data connections 510, 512, and 514. While three high-bandwidth data connections are depicted, any suitable number of high-bandwidth data connections can be employed. While high-bandwidth data connection 510 employs highly directional EM beam shaped transmissions, it is to be appreciated that high-bandwidth data connections 512 and/or 514 can employ highly directional EM beam shaped transmissions or wired connections.

In another example, location component 204 can attempt to determine an unobstructed line of sight between communication device 114 and communication device 124. In response to not being able to determine the unobstructed line of sight between communication device 114 and communication device 124, location component 204 can determine am unobstructed line of sight to another communication device in order for communication component 202 to establish a linked set of high bandwidth data connections between a plurality of communication devices using highly directional EM beam shaped transmissions to perform data transfers with the aircraft 116.

It is to be appreciated that communication devices 114 can be self-organizing in order to establish a mesh network of high bandwidth data connections between a plurality of communication devices using highly directional EM beam shaped transmissions to act as a repeater for data transfers between aircraft 116 and intelligent communication apparatus 102.

Figure 6A:
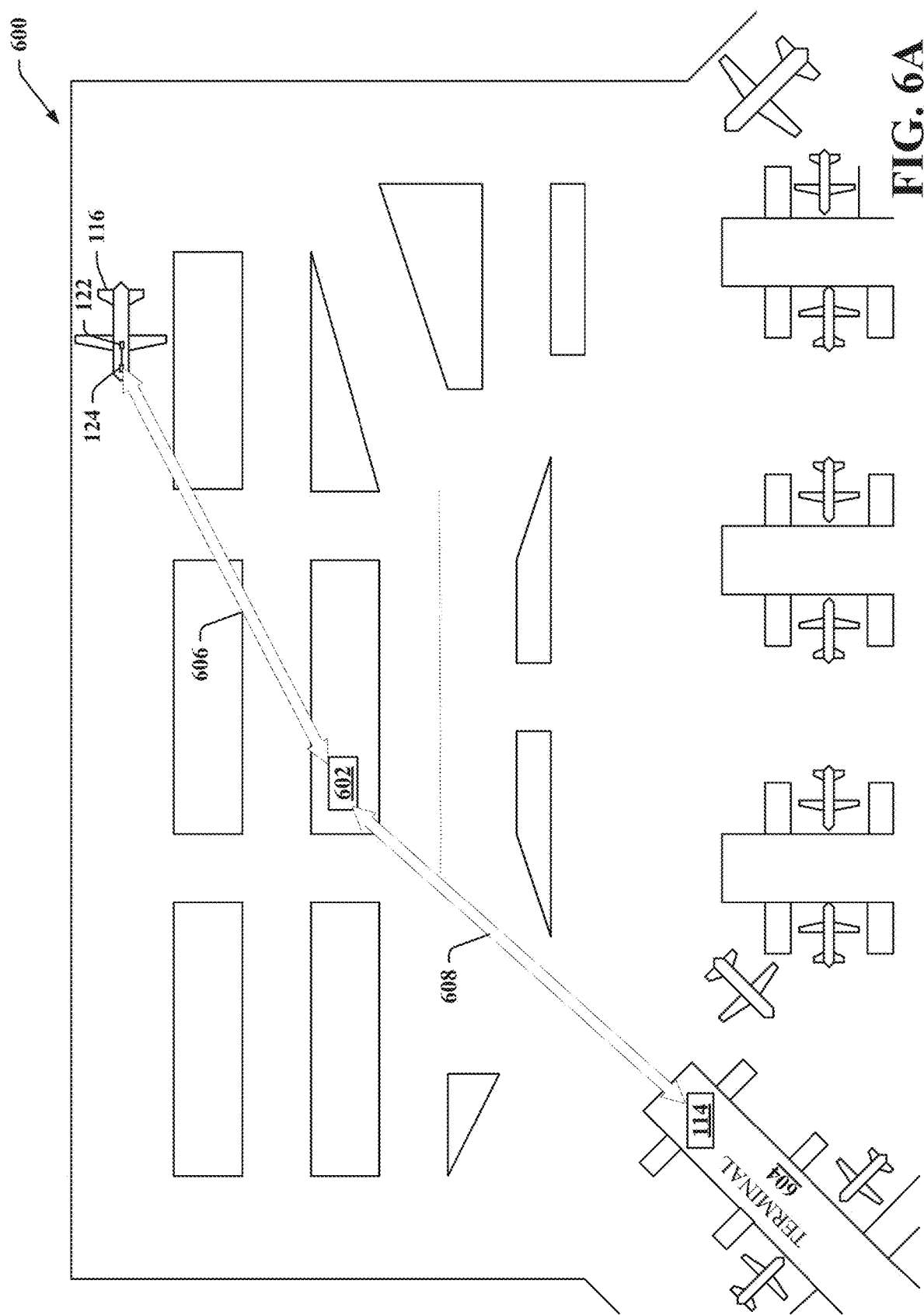
FIGS. 6A-6C illustrates a block diagram of a non-limiting example of establishing and maintaining of a high-bandwidth data connection with a moving aircraft in accordance with one or more embodiments described herein.
Figure 6B:
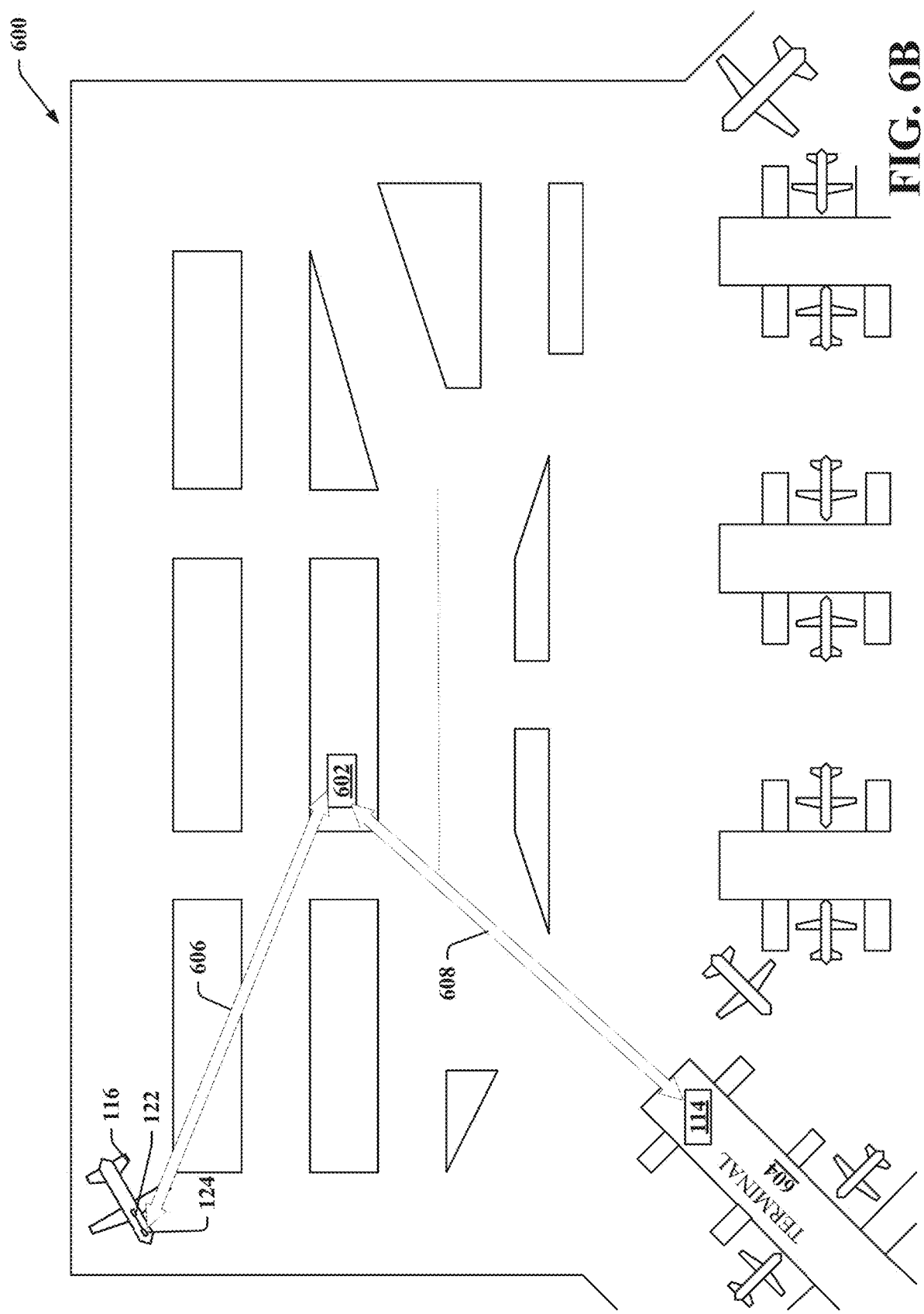
Figure 6C:
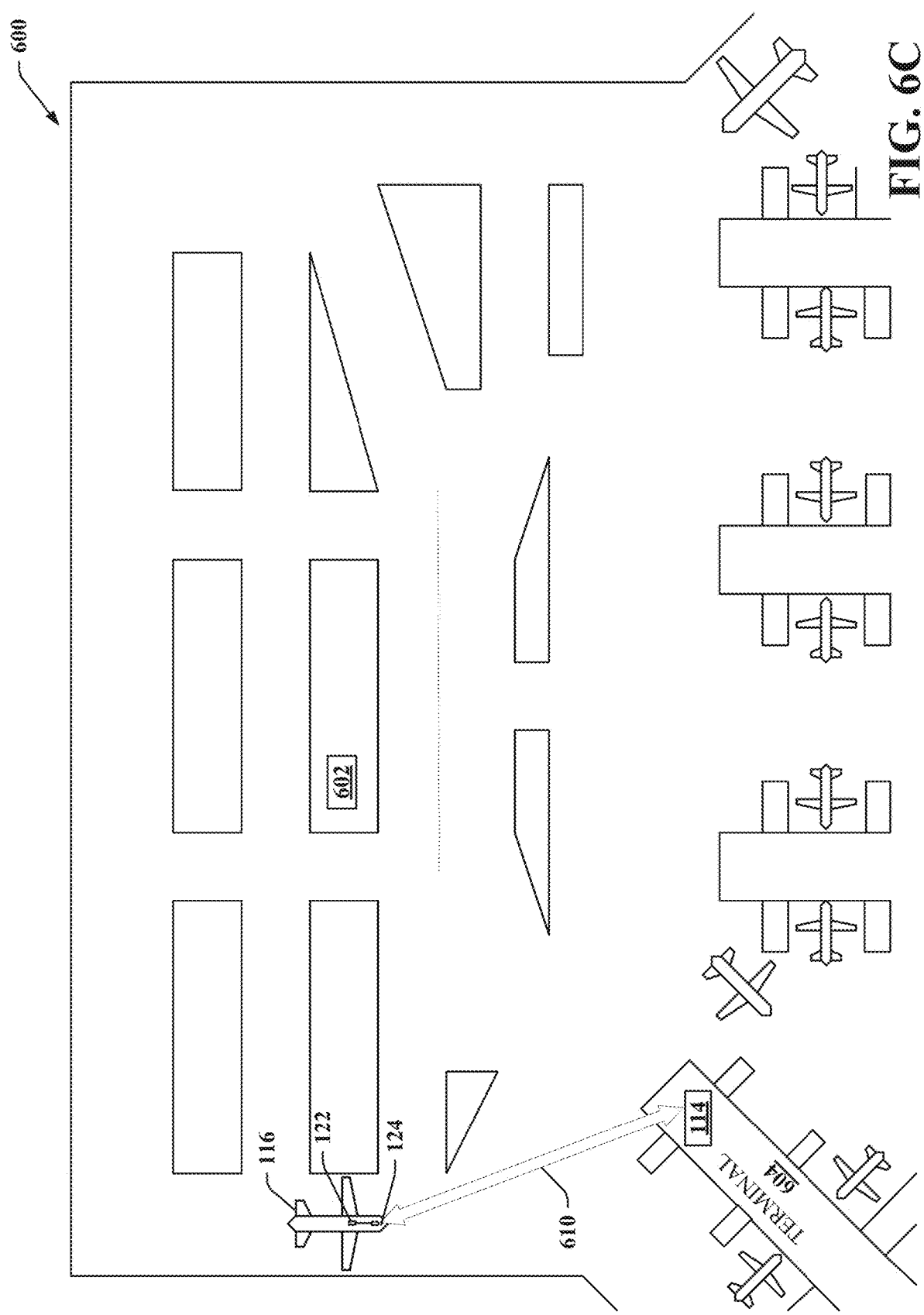

FIGS. 6A to 6C illustrates a block diagram of an example, non-limiting establishing of a high-bandwidth data connection between an aircraft 116 that has just landed at airport 600 and intelligent communication apparatus 102 using chained high-bandwidth data connections along unobstructed lines of sight between aircraft 116 and communication devices 114 and 602 in accordance with one or more embodiments described herein. Advantageously, the time window for transferring data to and/or from aircraft can be increased by establishing a high-bandwidth data connection with aircraft 116 that has landed, prior to the aircraft arriving at a gate.

FIG. 6A depicts aircraft 116 having landed at a landing strip and establishing a high-bandwidth data connection 606 using highly directional EM beam shaped transmissions between communication device 124 and communication device 602, and communication device 602 can establish high-bandwidth data connection 608 using highly directional EM beam shaped transmissions with communication device 114 at terminal 604. In this manner, a time window for performing data transfers between aircraft 116 and intelligent communication apparatus 102 is increased, for example, as compared to establishing the high-speed data connection between aircraft 116 and intelligent communication apparatus 102 at a gate of the terminal. It is to be appreciated that in other embodiments high-bandwidth data connection 608 can be a wired connection.

FIG. 6B depicts aircraft 116 having traversed down the landing strip. Communication devices 602 and 124 can dynamically steer highly directional EM beam shaped transmissions to maintain high-bandwidth data connection 606 along changing unobstructed line of sights between communication devices 602 and 124 as aircraft 116 moves at the airport.

FIG. 6C depicts aircraft 116 having traversed off the landing strip onto a tarmac and within a distance to establish a direct high-bandwidth data connection 610 with communication device 114 using highly directional EM beam shaped transmissions between communication devices 114 and 124. Communication devices 602 and 114 can perform any suitable handoff mechanism to maintain communication between aircraft 116 and intelligent communication apparatus 102.

While FIGS. 1 and 2 depict separate components in aircraft 116 and intelligent communication apparatus 102, it is to be appreciated that two or more components can be implemented in a common component. Further, it is to be appreciated that the design of the aircraft 116 or intelligent communication apparatus 102 can include other component selections and/or component placements to facilitate establishing a high-bandwidth data connection between an aircraft 116 and intelligent communication apparatus 102. Moreover, the aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components can be combined into a single component providing aggregate functionality. The components can also interact with one or more other components not specifically described herein for the sake of brevity, but known by those of skill in the art.

Further, some of the processes performed may be performed by specialized computers for carrying out defined tasks related to establishing a high-bandwidth data connection between an aircraft 116 and intelligent communication apparatus 102. The subject computer processing systems, methods apparatuses and/or computer program products can be employed to solve new problems that arise through advancements in technology, computer networks, the Internet and the like. The subject computer processing systems, methods apparatuses and/or computer program products can provide technical improvements to systems for establishing a high-bandwidth data connection between an aircraft 116 and intelligent communication apparatus 102 by improving processing efficiency among processing components in these systems, reducing delay in processing performed by the processing components, and improving the accuracy in which the processing systems establish a high-bandwidth data connection between an aircraft 116 and intelligent communication apparatus 102.

The embodiments of devices described herein can employ artificial intelligence (AI) to facilitate automating one or more features described herein. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect) described herein, components described herein can examine the entirety or a subset of the data to which it is granted access and can provide for reasoning about or determine states of the system, environment, etc.

from a set of observations as captured via events and/or data. Determinations can be employed to identify a specific context or action, and/or can generate a probability distribution over states, for example. The determinations can be probabilistic—that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, etc.)) schemes and/or systems (e.g., support vector machines, neural networks, expert systems, Bayesian belief networks, fuzzy logic, data fusion engines, etc.) in connection with performing automatic and/or determined action in connection with the claimed subject matter. Thus, classification schemes and/or systems can be used to automatically learn and perform a number of functions, actions, and/or determination.

A classifier can map an input attribute vector, z=(z1, z2, z3, z4, zn), to a confidence that the input belongs to a class, as by f(z)=confidence(class). Such classification can employ a probabilistic and/or statistical-based analysis (e.g., factoring into the analysis utilities and costs) to determinate an action to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

FIGS. 7-11 illustrate methodologies in accordance with one or more embodiments of the subject application. While, for purposes of simplicity of explanation, the methodologies shown herein is shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

Figure 7:
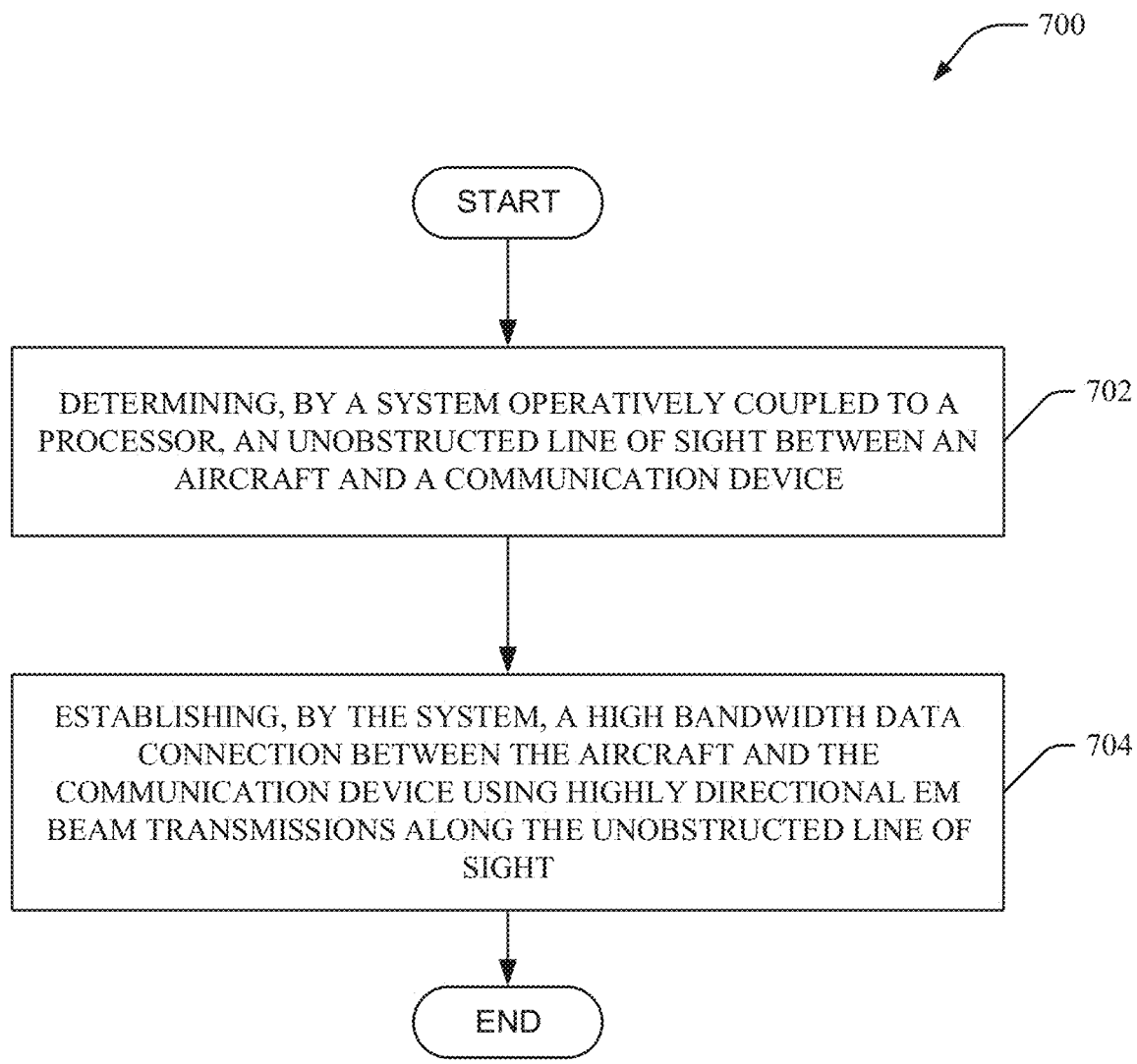
FIG. 7 illustrates a flow diagram of an example, non-limiting computer-implemented method that facilitates establishing of a high-bandwidth data connection with an aircraft in accordance with one or more embodiments described herein.

FIG. 7 illustrates a flow diagram of an example, non-limiting computer-implemented method 700 that facilitates establishing of a high-bandwidth data connection with an aircraft in accordance with one or more embodiments described herein. Repetitive description of like elements employed in other embodiments described herein is omitted for sake of brevity.

At 702, method 700 can comprise determining, by a system operatively coupled to a processor, an unobstructed line of sight between an aircraft and a communication device (e.g., via a location component 204, an adaptive signaling component 104, an intelligent communication apparatus 102, and/or a communication device 114). At 704, method 700 can comprise establishing, by the system, a high bandwidth data connection between the aircraft and the communication device using highly directional EM beam shaped transmissions along the unobstructed line of sight (e.g., via a communication component 202, an adaptive signaling component 104, an intelligent communication apparatus 102, and/or a communication device 114).

Figure 8:
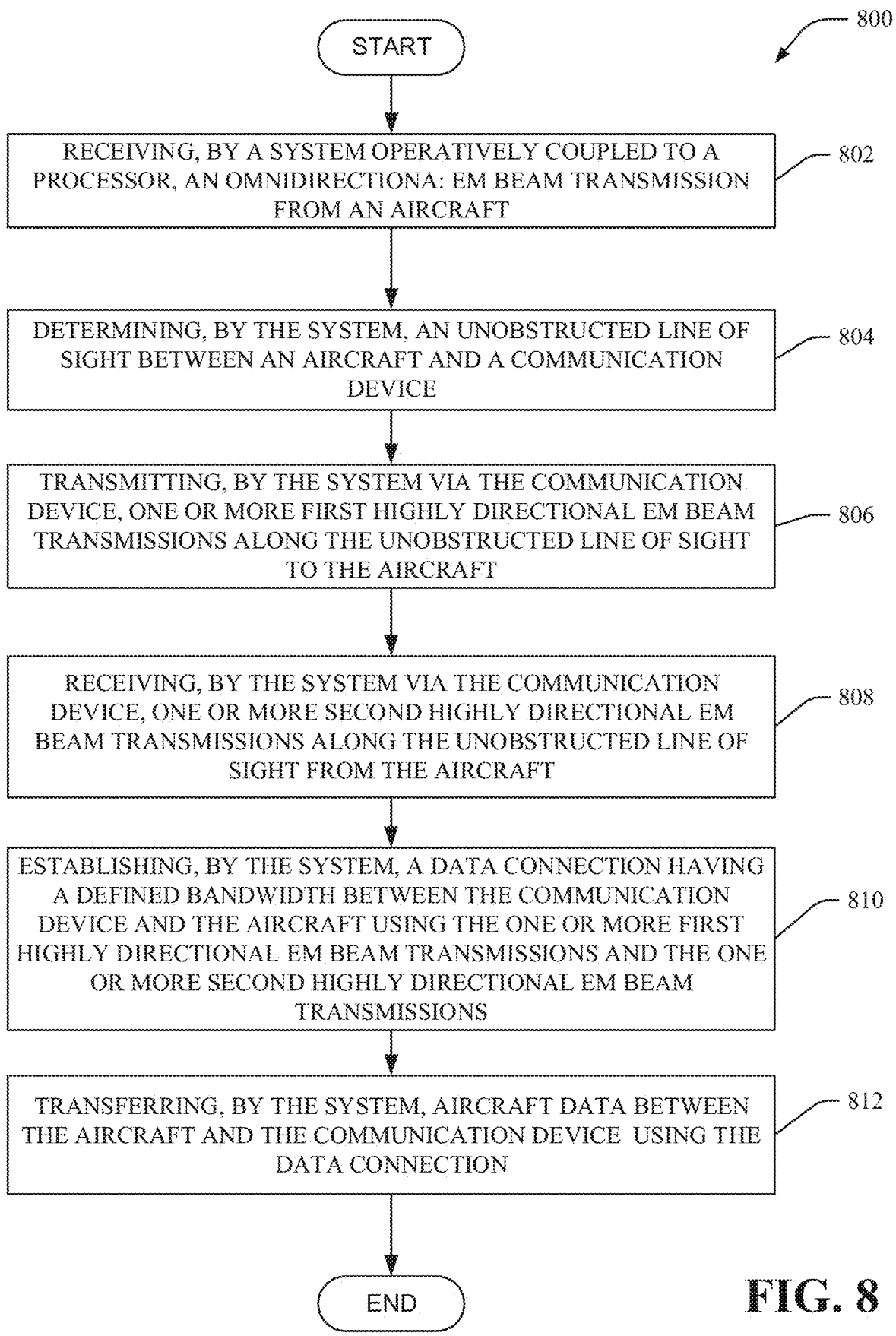
FIG. 8 illustrates a flow diagram of an example, non-limiting computer-implemented method that facilitates establishing of a high-bandwidth data connection with an aircraft in accordance with one or more embodiments described herein.

FIG. 8 illustrates a flow diagram of an example, non-limiting computer-implemented method 800 that facilitates establishing of a high-bandwidth data connection with an aircraft in accordance with one or more embodiments described herein. Repetitive description of like elements employed in other embodiments described herein is omitted for sake of brevity.

At 802, method 800 can comprise receiving, by a system operatively coupled to a processor, an omnidirectional transmission from an aircraft (e.g., via a communication component 202, an adaptive signaling component 104, an intelligent communication apparatus 102, and/or a communication device 114). At 804, method 800 can comprise determining, by the system, an unobstructed line of sight between an aircraft and a communication device (e.g., via a location component 204, an adaptive signaling component 104, an intelligent communication apparatus 102, and/or a communication device 114). At 806, method 800 can comprise transmitting, by the system via the communication device, one or more first highly directional EM beam shaped transmissions along the unobstructed line of sight to the aircraft (e.g., via a communication component 202, an adaptive signaling component 104, an intelligent communication apparatus 102, and/or a communication device 114). At 808, method 800 can comprise receiving, by the system via the communication device, one or more second highly directional EM beam shaped transmissions along the unobstructed line of sight from the aircraft (e.g., via a communication component 202, an adaptive signaling component 104, an intelligent communication apparatus 102, and/or a communication device 114). At 810, method 800 can comprise establishing, by the system, a data connection having a defined bandwidth between the communication device and the aircraft using the one or more first highly directional EM beam shaped transmissions and the one or more second highly directional EM beam shaped transmissions (e.g., via a communication component 202, an adaptive signaling component 104, an intelligent communication apparatus 102, and/or a communication device 114). At 810, method 800 can comprise transferring, by the system, aircraft data between the aircraft and the communication device using the data connection (e.g., via a communication component 202, an adaptive signaling component 104, an intelligent communication apparatus 102, and/or a communication device 114).

Figure 9:
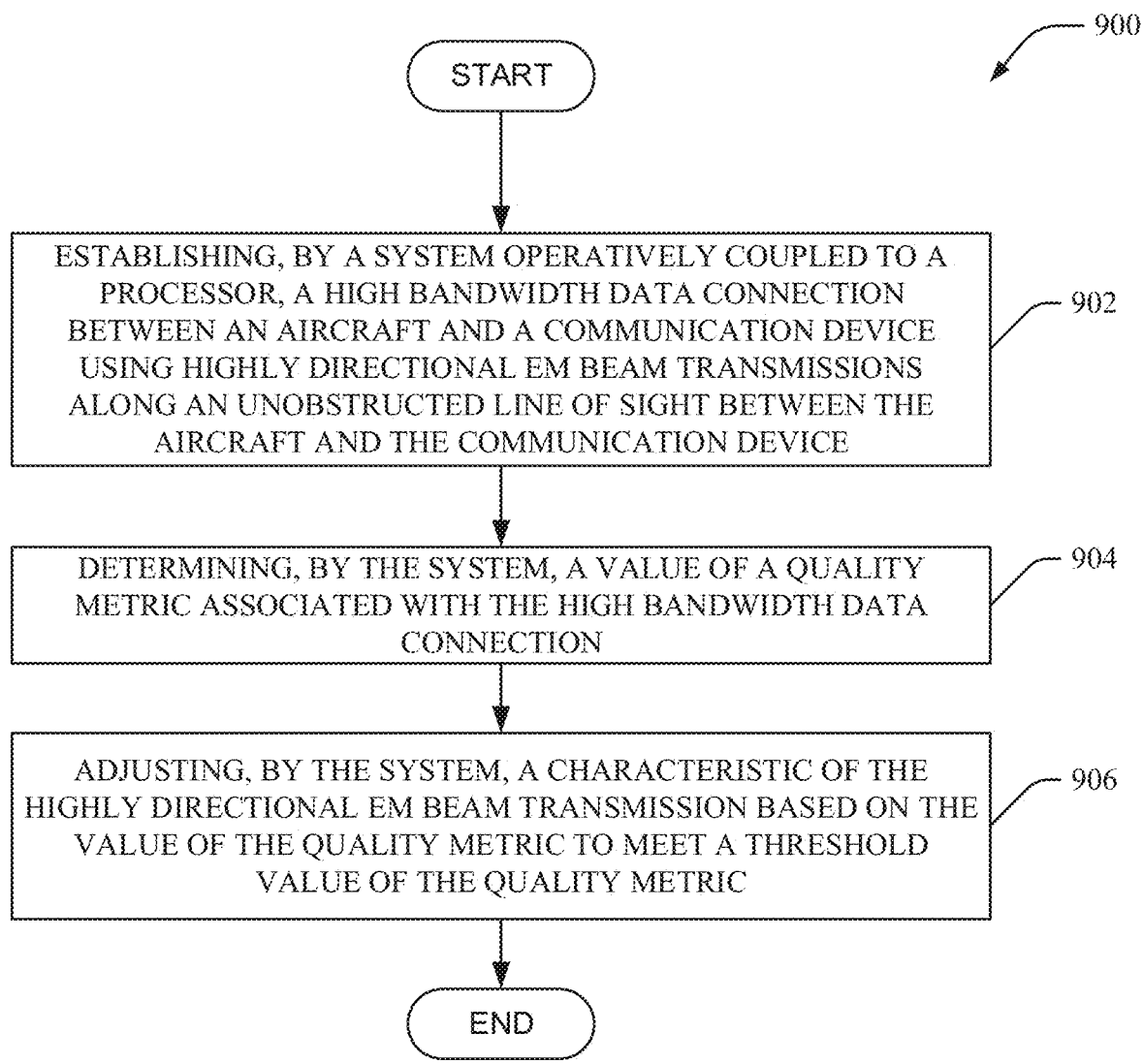
FIG. 9 illustrates a flow diagram of an example, non-limiting computer-implemented method that facilitates establishing of a high-bandwidth data connection with an aircraft in accordance with one or more embodiments described herein.

FIG. 9 illustrates a flow diagram of an example, non-limiting computer-implemented method 900 that facilitates establishing of a high-bandwidth data connection with an aircraft in accordance with one or more embodiments described herein. Repetitive description of like elements employed in other embodiments described herein is omitted for sake of brevity.

At 902, method 900 can comprise establishing, by a system operatively coupled to a processor, a high bandwidth data connection between an aircraft and a communication device using highly directional EM beam shaped transmissions along an unobstructed line of sight between the aircraft and the communication device (e.g., via a communication component 202, an adaptive signaling component 104, an intelligent communication apparatus 102, and/or a communication device 114). At 904, method 900 can comprise determining, by the system, a value of a quality metric associated with the high bandwidth data connection (e.g., via a signal measurement component 206, a communication component 202, a location component 204, an adaptive signaling component 104, an intelligent communication apparatus 102, and/or a communication device 114). At 906, method 900 can comprise adjusting, by the system, a characteristic of the highly directional EM beam shaped transmission based on the value of the quality metric to meet a threshold value of the quality metric (e.g., via a communication component 202, an adaptive signaling component 104, an intelligent communication apparatus 102, and/or a communication device 114).

Figure 10:
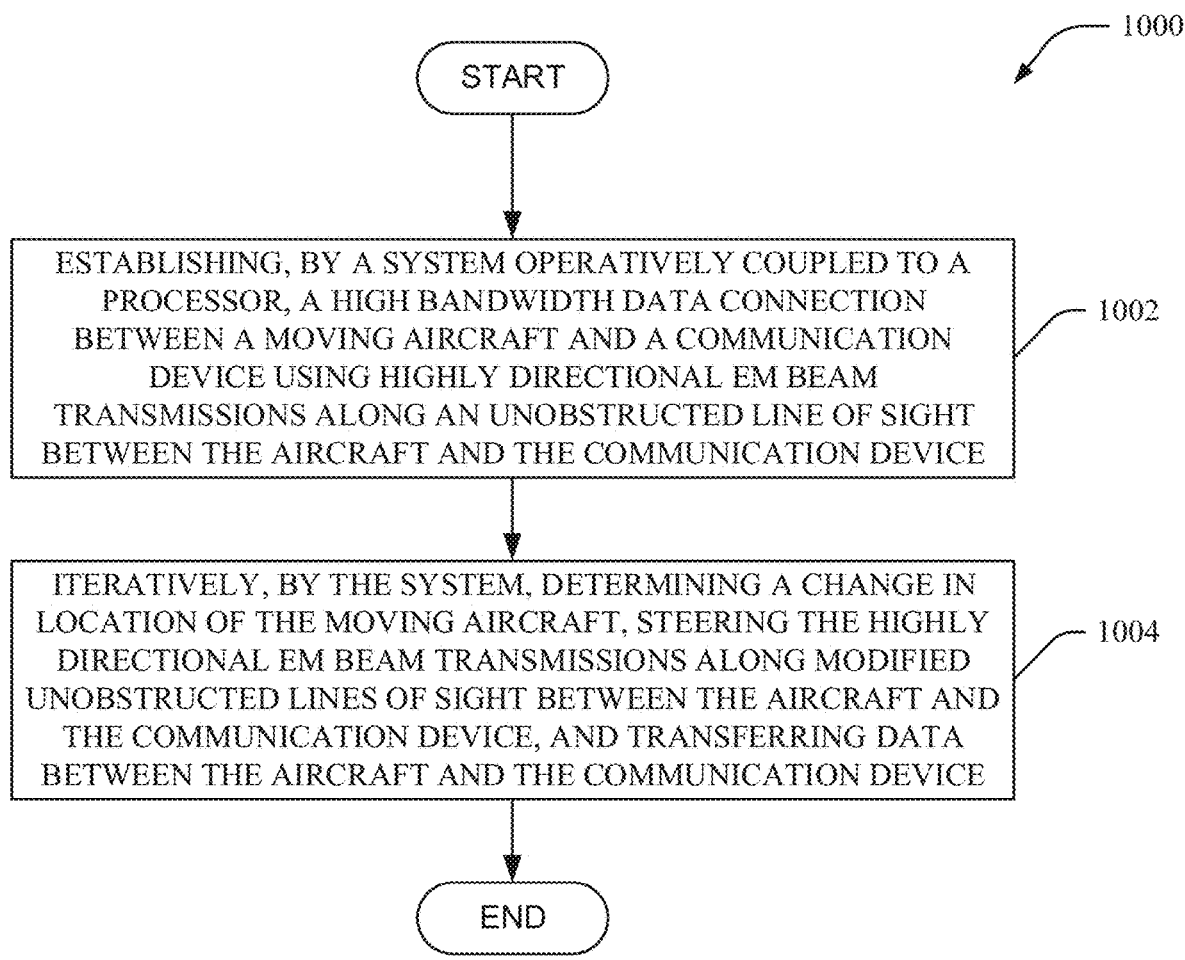
FIG. 10 illustrates a flow diagram of an example, non-limiting computer-implemented method that facilitates establishing of a high-bandwidth data connection with an aircraft in accordance with one or more embodiments described herein.

FIG. 10 illustrates a flow diagram of an example, non-limiting computer-implemented method 1000 that facilitates establishing of a high-bandwidth data connection with an aircraft in accordance with one or more embodiments described herein. Repetitive description of like elements employed in other embodiments described herein is omitted for sake of brevity.

At 1002, method 1000 can comprise establishing, by a system operatively coupled to a processor, a high bandwidth data connection between a moving aircraft and a communication device using highly directional EM beam shaped transmissions along an unobstructed line of sight between the aircraft and the communication device (e.g., via a communication component 202, a signal measurement component 206, a location component 204, an adaptive signaling component 104, an intelligent communication apparatus 102, and/or a communication device 114). At 1004, method 1000 can comprise iteratively, by the system, determining a change in location of the moving aircraft, steering the highly directional EM beam shaped transmissions along modified unobstructed lines of sight between the aircraft and the communication device, and transferring data between the aircraft and the communication device (e.g., via a communication component 202, a signal measurement component 206, a location component 204, an adaptive signaling component 104, an intelligent communication apparatus 102, and/or a communication device 114).

Figure 11:
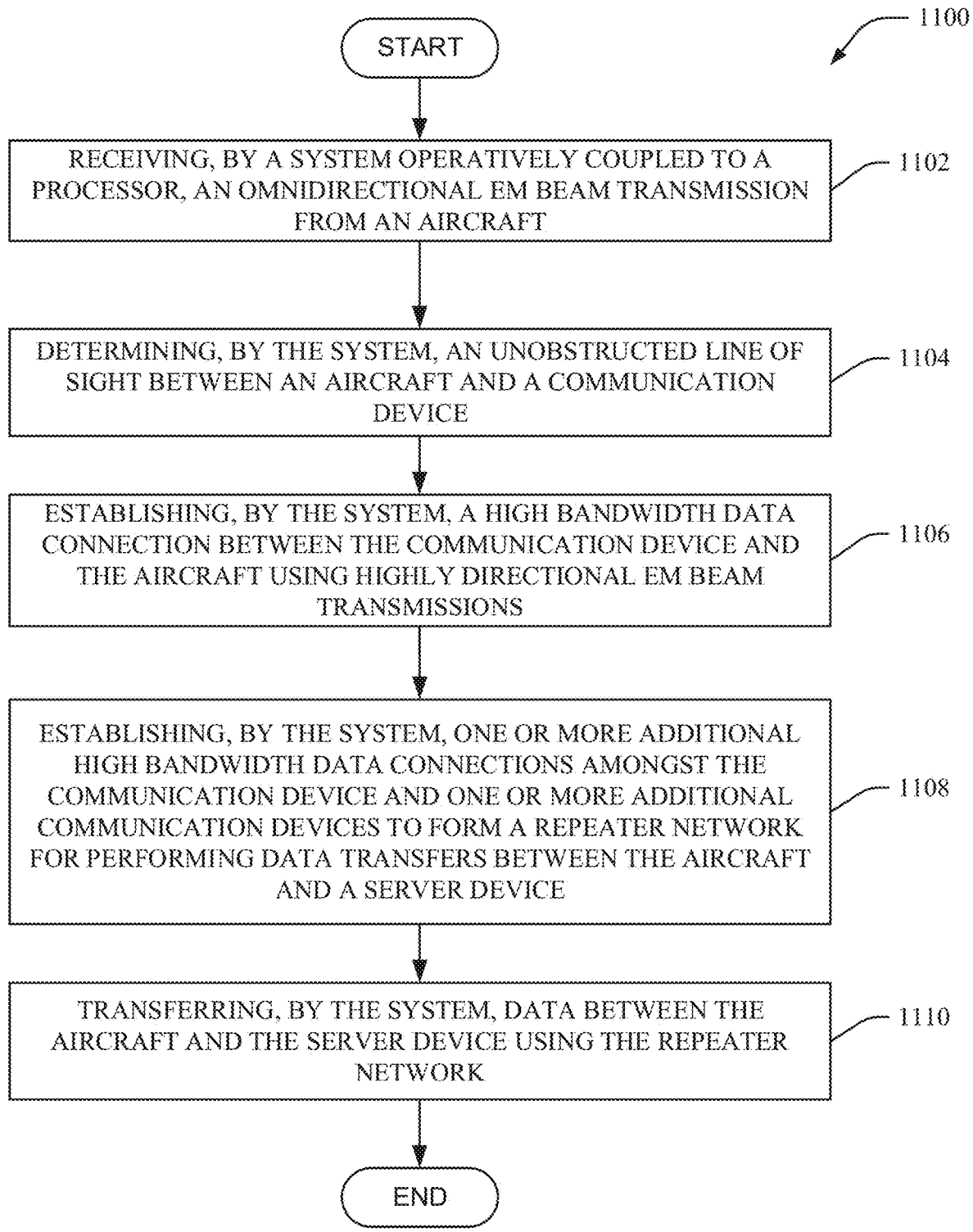
FIG. 11 illustrates a flow diagram of an example, non-limiting computer-implemented method that facilitates establishing of a high-bandwidth data connection with an aircraft in accordance with one or more embodiments described herein.

FIG. 11 illustrates a flow diagram of an example, non-limiting computer-implemented method 1100 that facilitates establishing of a high-bandwidth data connection with an aircraft in accordance with one or more embodiments described herein. Repetitive description of like elements employed in other embodiments described herein is omitted for sake of brevity.

At 1102, method 1100 can comprise receiving, by a system operatively coupled to a processor, an omnidirectional transmission from an aircraft (e.g., via a communication component 202, an adaptive signaling component 104, an intelligent communication apparatus 102, and/or a communication device 114). At 1104, method 1100 can comprise determining, by the system, an unobstructed line of sight between an aircraft and a communication device (e.g., via a communication component 202, an adaptive signaling component 104, an intelligent communication apparatus 102, and/or a communication device 114). At 1106, method 1100 can comprise establishing, by the system, a high bandwidth data connection between the communication device and the aircraft using highly directional EM beam shaped transmissions (e.g., via a communication component 202, an adaptive signaling component 104, an intelligent communication apparatus 102, and/or a communication device 114). At 1108, method 1100 can comprise establishing, by the system, one or more additional high bandwidth data connections amongst the communication device and one or more additional communication devices to form a repeater network for performing data transfers between the aircraft and a server device (e.g., via a communication component 202, an adaptive signaling component 104, an intelligent communication apparatus 102, and/or a communication device 114). At 1110, method 1100 can comprise transferring, by the system, data transfers between the aircraft and the server device using the repeater network (e.g., via a communication component 202, an adaptive signaling component 104, an intelligent communication apparatus 102, and/or a communication device 114).

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 12:
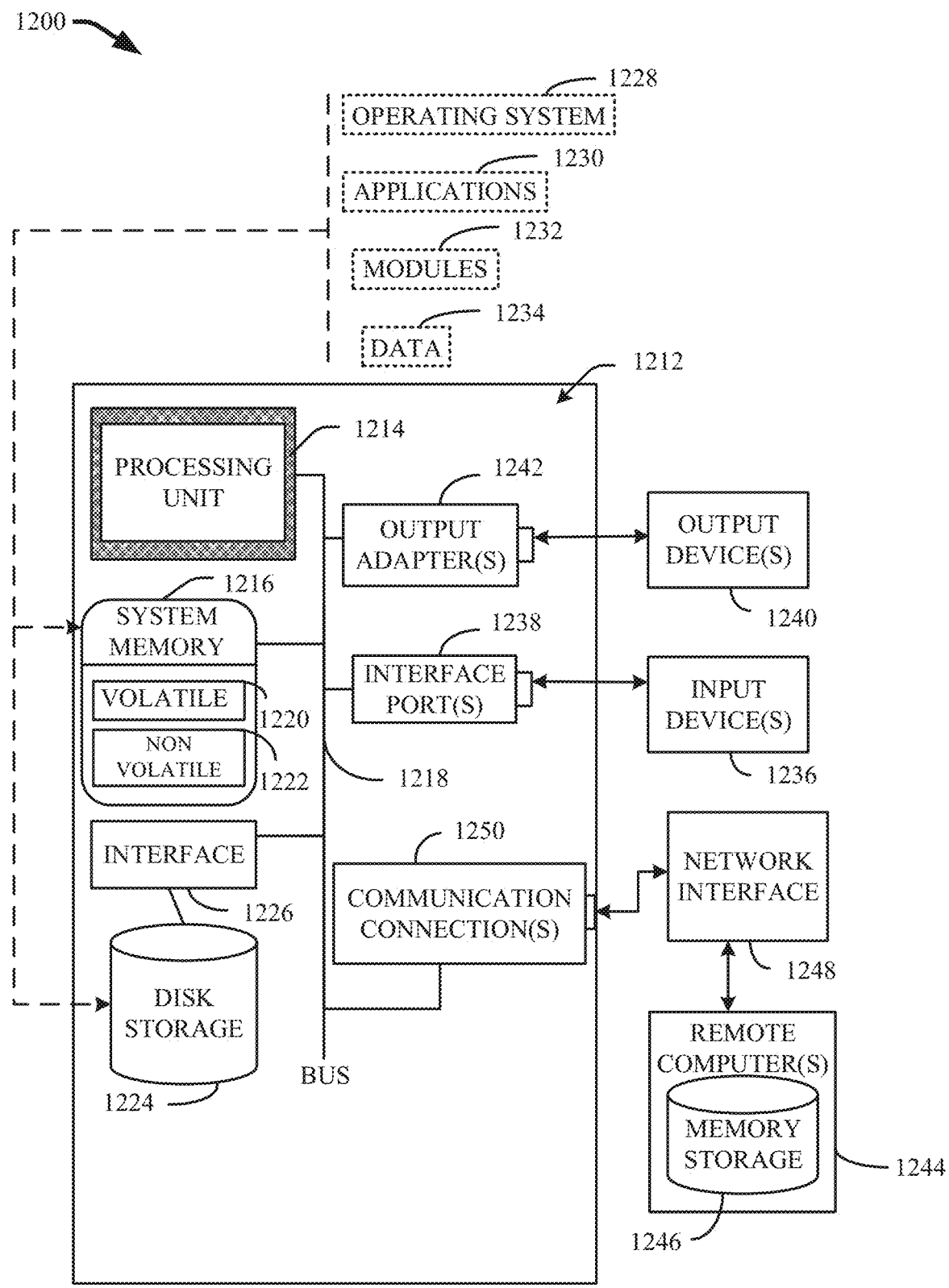
FIG. 12 illustrates a block diagram of an example, non-limiting operating environment in which one or more embodiments described herein can be facilitated.

In order to provide a context for the various aspects of the disclosed subject matter, FIG. 12 as well as the following discussion are intended to provide a general description of a suitable environment in which the various aspects of the disclosed subject matter can be implemented. FIG. 12 illustrates a block diagram of an example, non-limiting operating environment in which one or more embodiments described herein can be facilitated. Repetitive description of like elements employed in other embodiments described herein is omitted for sake of brevity. With reference to FIG. 12, a suitable operating environment 1200 for implementing various aspects of this disclosure can also include a computer 1212. The computer 1212 can also include a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214. The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1294), and Small Computer Systems Interface (SCSI). The system memory 1216 can also include volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1220 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1212 can also include removable/non-removable, volatile/nonvolatile computer storage media. FIG. 12 illustrates, for example, a disk storage 1224. Disk storage 1224 can also include, but is not limited to, devices like a magnetic disk drive, floppy disk drive, tape drive, Jaz drive, Zip drive, LS-100 drive, flash memory card, or memory stick. The disk storage 1224 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1224 to the system bus 1218, a removable or non-removable interface is typically used, such as interface 1226. FIG. 12 also depicts software that acts as an intermediary between users and the basic computer resources described in the suitable operating environment 1201. Such software can also include, for example, an operating system 1228. Operating system 1228, which can be stored on disk storage 1224, acts to control and allocate resources of the computer 1212. System applications 1230 take advantage of the management of resources by operating system 1228 through program modules 1232 and program data 1234, e.g., stored either in system memory 1216 or on disk storage 1224. It is to be appreciated that this disclosure can be implemented with various operating systems or combinations of operating systems. A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port can be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a computer, a server, a router, a network PC, a workstation, a microprocessor based appliance, a peer device or other common network node and the like, and typically can also include many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1250 refers to the hardware/software employed to connect the network interface 1248 to the system bus 1218. While communication connection 1250 is shown for illustrative clarity inside computer 1212, it can also be external to computer 1212. The hardware/software for connection to the network interface 1248 can also include, for exemplary purposes only, internal and external technologies such as, modems including regular telephone grade modems, cable modems and DSL modems, ISDN adapters, and Ethernet cards.

Figure 13:
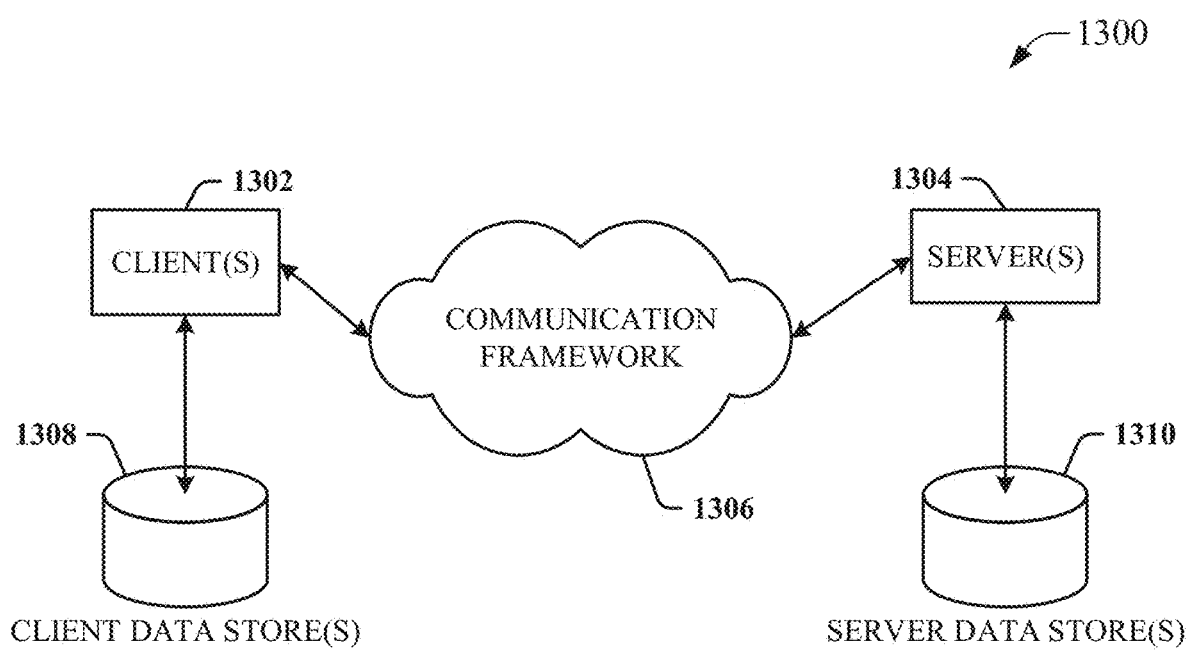
FIG. 13 illustrates a block diagram of an example, non-limiting computer environment in which one or more embodiments described herein can be facilitated.

FIG. 13 is a schematic block diagram of a sample computing environment 1300 with which the disclosed subject matter can interact. The sample computing environment 1300 includes one or more client(s) 1302. The client(s) 1302 can be hardware and/or software (e.g., threads, processes, computing devices). The sample computing environment 1300 also includes one or more server(s) 1304. The server(s) 1304 can also be hardware and/or software (e.g., threads, processes, computing devices). The servers 1304 can house threads to perform transformations by employing one or more embodiments as described herein, for example. One possible communication between a client 1302 and servers 1304 can be in the form of a data packet adapted to be transmitted between two or more computer processes. The sample computing environment 1300 includes a communication framework 1306 that can be employed to facilitate communications between the client(s) 1302 and the server(s) 1304. The client(s) 1302 are operably connected to one or more client data store(s) 1308 that can be employed to store information local to the client(s) 1302. Similarly, the server(s) 1304 are operably connected to one or more server data store(s) 1310 that can be employed to store information local to the servers 1304.

Figure 14:
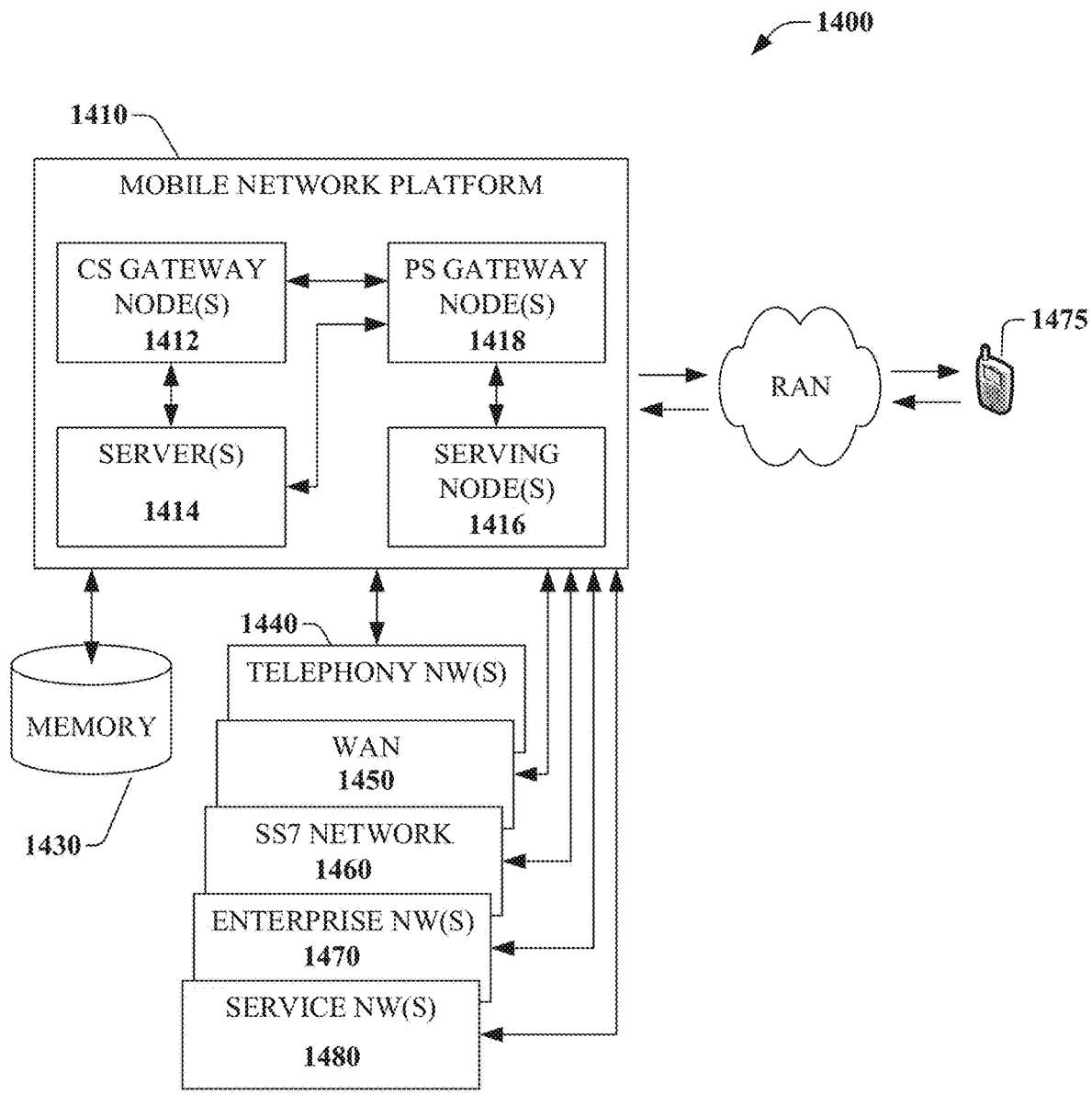
FIG. 14 illustrates a block diagram of an example, non-limiting communication environment in which one or more embodiments described herein can be facilitated.

FIG. 14 illustrates a block diagram of an example, non-limiting communication environment 1400 of a mobile network platform 1410 that can implement and exploit one or more aspects of the disclosed subject matter described herein. Generally, wireless network platform 1410 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 1410 can be included in telecommunications carrier networks, and can be considered carrier-side components as discussed elsewhere herein. Mobile network platform 1410 comprises CS gateway node(s) 1412 which can interface CS traffic received from legacy networks like telephony network(s) 1440 (e.g., public switched telephone network (PSTN), or public land mobile network (PLMN)) or a signaling system #7 (SS7) network 1470. Circuit switched gateway node(s) 1412 can authorize and authenticate traffic (e.g., voice) arising from such networks. Additionally, CS gateway node(s) 1412 can access mobility, or roaming, data generated through SS7 network 1470; for instance, mobility data stored in a visited location register (VLR), which can reside in memory 1430. Moreover, CS gateway node(s) 1412 interfaces CS-based traffic and signaling and PS gateway node(s) 1418. As an example, in a 3GPP UMTS network, CS gateway node(s) 1412 can be realized at least in part in gateway GPRS support node(s) (GGSN). It should be appreciated that functionality and specific operation of CS gateway node(s) 1412, PS gateway node(s) 1418, and serving node(s) 1416, is provided and dictated by radio technology(ies) utilized by mobile network platform 1410 for telecommunication. Mobile network platform 1410 can also comprise the MMEs, HSS/PCRFs, SGWs, and PGWs disclosed herein.

In addition to receiving and processing CS-switched traffic and signaling, PS gateway node(s) 1418 can authorize and authenticate PS-based data sessions with served mobile devices. Data sessions can comprise traffic, or content(s), exchanged with networks external to the wireless network platform 1410, like wide area network(s) (WANs) 1450, enterprise network(s) 1470, and service network(s) 1480, which can be embodied in local area network(s) (LANs), can also be interfaced with mobile network platform 1410 through PS gateway node(s) 1418. It is to be noted that WANs 1450 and enterprise network(s) 1460 can embody, at least in part, a service network(s) like IP multimedia subsystem (IMS). Based on radio technology layer(s) available in technology resource(s) 1417, packet-switched gateway node(s) 1418 can generate packet data protocol contexts when a data session is established; other data structures that facilitate routing of packetized data also can be generated. To that end, in an aspect, PS gateway node(s) 1418 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 1400, wireless network platform 1410 also comprises serving node(s) 1416 that, based upon available radio technology layer(s) within technology resource(s) 1417, convey the various packetized flows of data streams received through PS gateway node(s) 1418. It is to be noted that for technology resource(s) 1417 that rely primarily on CS communication, server node(s) can deliver traffic without reliance on PS gateway node(s) 1418; for example, server node(s) can embody at least in part a mobile switching center. As an example, in a 3GPP UMTS network, serving node(s) 1416 can be embodied in serving GPRS support node(s) (SGSN).

For radio technologies that exploit packetized communication, server(s) 1414 in wireless network platform 1410 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by wireless network platform 1410. Data streams (e.g., content(s) that are part of a voice call or data session) can be conveyed to PS gateway node(s) 1418 for authorization/authentication and initiation of a data session, and to serving node(s) 1416 for communication thereafter. In addition to application server, server(s) 1414 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through wireless network platform 1410 to ensure network's operation and data integrity in addition to authorization and authentication procedures that CS gateway node(s) 1412 and PS gateway node(s) 1418 can enact. Moreover, provisioning server(s) can provision services from external network(s) like networks operated by a disparate service provider; for instance, WAN 1450 or Global Positioning System (GPS) network(s) (not shown). Provisioning server(s) can also provision coverage through networks associated to wireless network platform 1410 (e.g., deployed and operated by the same service provider), such as femto-cell network(s) (not shown) that enhance wireless service coverage within indoor confined spaces and offload RAN resources in order to enhance subscriber service experience within a home or business environment by way of UE 1475.

It is to be noted that server(s) 1414 can comprise one or more processors configured to confer at least in part the functionality of macro network platform 1410. To that end, the one or more processor can execute code instructions stored in memory 1430, for example. It is should be appreciated that server(s) 1414 can comprise a content manager 1415, which operates in substantially the same manner as described hereinbefore.

In example embodiment 1400, memory 1430 can store information related to operation of wireless network platform 1410. Other operational information can comprise provisioning information of mobile devices served through wireless platform network 1410, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1430 can also store information from at least one of telephony network(s) 1440, WAN 1450, enterprise network(s) 1460, or SS7 network 1470. In an aspect, memory 1430 can be, for example, accessed as part of a data store component or as a remotely connected memory store.

Embodiments of the present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

Furthermore, the term "set" as employed herein excludes the empty set; e.g., the set with no elements therein, unless expressly indicated otherwise. Thus, a "set" in the subject disclosure includes one or more elements or entities. As an illustration, a set of devices includes one or more devices; a set of data resources includes one or more data resources, unless expressly indicated otherwise; etc. Likewise, the term "group" as utilized herein refers to a collection of one or more entities; e.g., a group of nodes refers to one or more nodes.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   receiving, by a system operatively coupled to a processor, a transmission from an aircraft;
   determining, by the system, an unobstructed line of sight between the aircraft and a communication device;
   transmitting, by the system via the communication device, one or more first highly directional electromagnetic (EM) beam shaped transmissions along the unobstructed line of sight to the aircraft;
   receiving, by the system via the communication device, one or more second highly directional EM beam shaped transmissions from the aircraft along the unobstructed line of sight
   establishing, by the system, a wireless data connection between the communication device and the aircraft using the one or more first highly directional EM beam shaped transmissions and the one or more second directional highly EM beam shaped transmissions;
   adjusting, by the system, at least one characteristic of the one or more first highly directional EM beam shaped transmissions based on a current value of a bandwidth of the wireless data connection to meet a threshold value of the bandwidth, wherein the threshold value of the bandwidth is selected to complete a data transfer of a defined amount of data between the aircraft and the system; and
   transferring, by the system, aircraft data between the aircraft and the communication device using the wireless data connection.

2. The method of claim 1, further comprising determining, by the system, the current value of the bandwidth of the wireless data connection.

3. The method of claim 1, further comprising adjusting, by the system, the at least one characteristic of the one or more first highly directional EM beam shaped transmissions further based on a current value of a signal-to-noise ratio of the wireless data connection to meet a threshold value of the signal-to-noise ratio, wherein the threshold value of the signal-to-noise ratio is selected to maintain the bandwidth of the wireless data connection.

4. The method of claim 1, iteratively performing, by the system:
   determining a change in a location of the aircraft; and
   steering the one or more first highly directional EM beam shaped transmissions along modified unobstructed lines of sight between the aircraft and the communication device.

5. The method of claim 1, further comprising determining the threshold value of the bandwidth based upon an amount of time that the aircraft will be in a defined location.

6. A system, comprising:
   a first directional antenna;
   a processor; and
   a memory communicatively coupled to the processor, the memory having stored therein computer-executable instructions, comprising:
   an adaptive signaling component configured to:
     receive a transmission from an aircraft;
     determine an unobstructed line of sight between the aircraft and a communication device;
     transmit one or more first highly directional electromagnetic (EM) beam shaped transmissions to the aircraft along the unobstructed line of sight;
     receive one or more second highly directional EM beam shaped transmissions along the unobstructed line of sight from the aircraft
     establish a wireless data connection having between the communication device and the aircraft using the one or more first highly directional EM beam shaped transmissions and the one or more second directional highly EM beam shaped transmissions;
     adjust at least one characteristic of the one or more first highly directional EM beam shaped transmissions based on a current value of a bandwidth of the wireless data connection to meet a threshold value of the bandwidth, wherein the threshold value of the bandwidth is selected to complete a data transfer of a defined amount of data between the aircraft and the system; and
     transfer aircraft data between the aircraft and the communication device using the wireless data connection.

7. The system of claim 6, wherein the adaptive signaling component is further configured to determine the current value of the bandwidth of the wireless data connection.

8. The system of claim 7, wherein the adaptive signaling component is further configured to adjust the at least one characteristic of the one or more first highly directional EM beam shaped transmissions further based on a current value of a signal-to-noise ratio of the wireless data connection to meet a threshold value of the signal-to-noise ratio, wherein the threshold value of the signal-to-noise ratio is selected to maintain the bandwidth of the wireless data connection.

9. The system of claim 6, wherein the adaptive signaling component is further configured to iteratively perform:
   determine a change in a location of the aircraft; and
   steer the one or more first highly directional EM beam shaped transmissions along modified unobstructed lines of sight between the aircraft and the communication device.

10. The system of claim 6, wherein the adaptive signaling component is further configured to determine the threshold value of the bandwidth based upon an amount of time that the aircraft will be in a defined location.

11. A non-transitory computer-readable medium having instructions stored thereon that, in response to execution, cause a communication device including a processor to perform operations comprising:
   determining a line of sight that is unobstructed to an antenna of an aircraft;
   establishing a wireless data connection having a defined data transfer rate between the aircraft and the communication device using highly directional electromagnetic (EM) beam shaped transmissions along the unobstructed line of sight;

adjusting at least one parameter of the highly directional EM beam shaped transmissions based on a current value of a signal-to-noise ratio of the wireless data connection to meet a threshold value of the signal-to-noise ratio, wherein the threshold value of the signal-to-noise ratio is selected to maintain the defined data transfer rate; and transferring a defined amount of data between the aircraft and the communication device using the wireless data connection within a defined time window.

12. The non-transitory computer-readable medium of claim 11, wherein the at least one parameter comprises a focal arc of the highly directional EM beam shaped transmissions.

13. The non-transitory computer-readable medium of claim 11, wherein the at least one parameter comprises a power level of the highly directional EM beam shaped transmissions.

14. The non-transitory computer-readable medium of claim 11, wherein the at least one parameter comprises a frequency of the highly directional EM beam shaped transmissions.

15. The non-transitory computer-readable medium of claim 11, wherein the at least one parameter comprises a pattern of the highly directional EM beam shaped transmissions.

16. The computer implemented method of claim 1, wherein the at least one characteristic of the one or more first highly directional EM beam shaped transmissions comprises a focal arc of the one or more first highly directional EM beam shaped transmissions.

17. The computer implemented method of claim 1, wherein the at least one characteristic of the one or more first highly directional EM beam shaped transmissions comprises a power level of the one or more first highly directional EM beam shaped transmissions.

18. The computer implemented method of claim 1, wherein the at least one characteristic of the one or more first highly directional EM beam shaped transmissions comprises a frequency of the one or more first highly directional EM beam shaped transmissions.

19. The computer implemented method of claim 1, wherein the at least one characteristic of the one or more first highly directional EM beam shaped transmissions comprises a pattern of the one or more first highly directional EM beam shaped transmissions.

20. The system of claim 6, wherein the at least one characteristic of the one or more first highly directional EM beam shaped transmissions comprises a pattern of the one or more first highly directional EM beam shaped transmissions.

* * * * *